United States Patent
Terasawa

(10) Patent No.: US 8,902,329 B2
(45) Date of Patent: Dec. 2, 2014

(54) IMAGE PROCESSING APPARATUS FOR CORRECTING IMAGE DEGRADATION CAUSED BY ABERRATIONS AND METHOD OF CONTROLLING THE SAME

(71) Applicant: Canon Kabushiki Kaisha, Tokyo (JP)

(72) Inventor: Ken Terasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/056,344

(22) Filed: Oct. 17, 2013

(65) Prior Publication Data

US 2014/0044374 A1 Feb. 13, 2014

Related U.S. Application Data

(63) Continuation of application No. 13/045,053, filed on Mar. 10, 2011, now Pat. No. 8,587,712.

(30) Foreign Application Priority Data

Mar. 29, 2010 (JP) ................. 2010-076201

(51) Int. Cl.
*H04N 5/228* (2006.01)
*H04N 9/04* (2006.01)
*G06T 5/00* (2006.01)
*H04N 5/357* (2011.01)

(52) U.S. Cl.
CPC ................. *G06T 5/001* (2013.01); *H04N 9/045* (2013.01); *G06T 5/006* (2013.01); *H04N 5/3572* (2013.01)
USPC ........................................ 348/222.1; 348/251

(58) Field of Classification Search
CPC ..... H04N 5/357; H04N 5/367; H04N 5/3675; G06T 5/005
USPC ............... 348/241–246, 222.1, 272–281, 251
See application file for complete search history.

(56) References Cited

U.S. PATENT DOCUMENTS 6,493,029 B1 * 12/2002 Denyer et al. ................. 348/236
2004/0165082 A1 * 8/2004 Takai .......................... 348/222.1

OTHER PUBLICATIONS

Malvar et al., High-Quality Linear Interpolation for Demosaicing of Bayer-Patterned Color Images, May 2004, Microsoft Research.*

* cited by examiner

*Primary Examiner* — Nelson D. Hernández Hernández
(74) *Attorney, Agent, or Firm* — Cowan, Liebowitz & Latman, P.C.

(57) ABSTRACT

The correction amount of an aberration caused in each pixel of the region by the optical system is calculated. A predetermined number of peripheral pixels center on a position apart from the pixel by the distance corresponding to the calculated aberration correction amount are multiplied by interpolation coefficients obtained from an interpolation function and added, thereby deriving the pixel value at the pixel position after correction. If the predetermined number of peripheral pixels around the position apart by the distance corresponding to the calculated aberration correction amount are not present in the readout region, aberration correction is implemented by changing the interpolation function. More specifically, the interpolation function is changed so as to make the frequency response behavior of the interpolation function more moderate than that of the interpolation function that gives the interpolation coefficients to multiply the predetermined number of peripheral pixels and used in the correction processing.

8 Claims, 16 Drawing Sheets

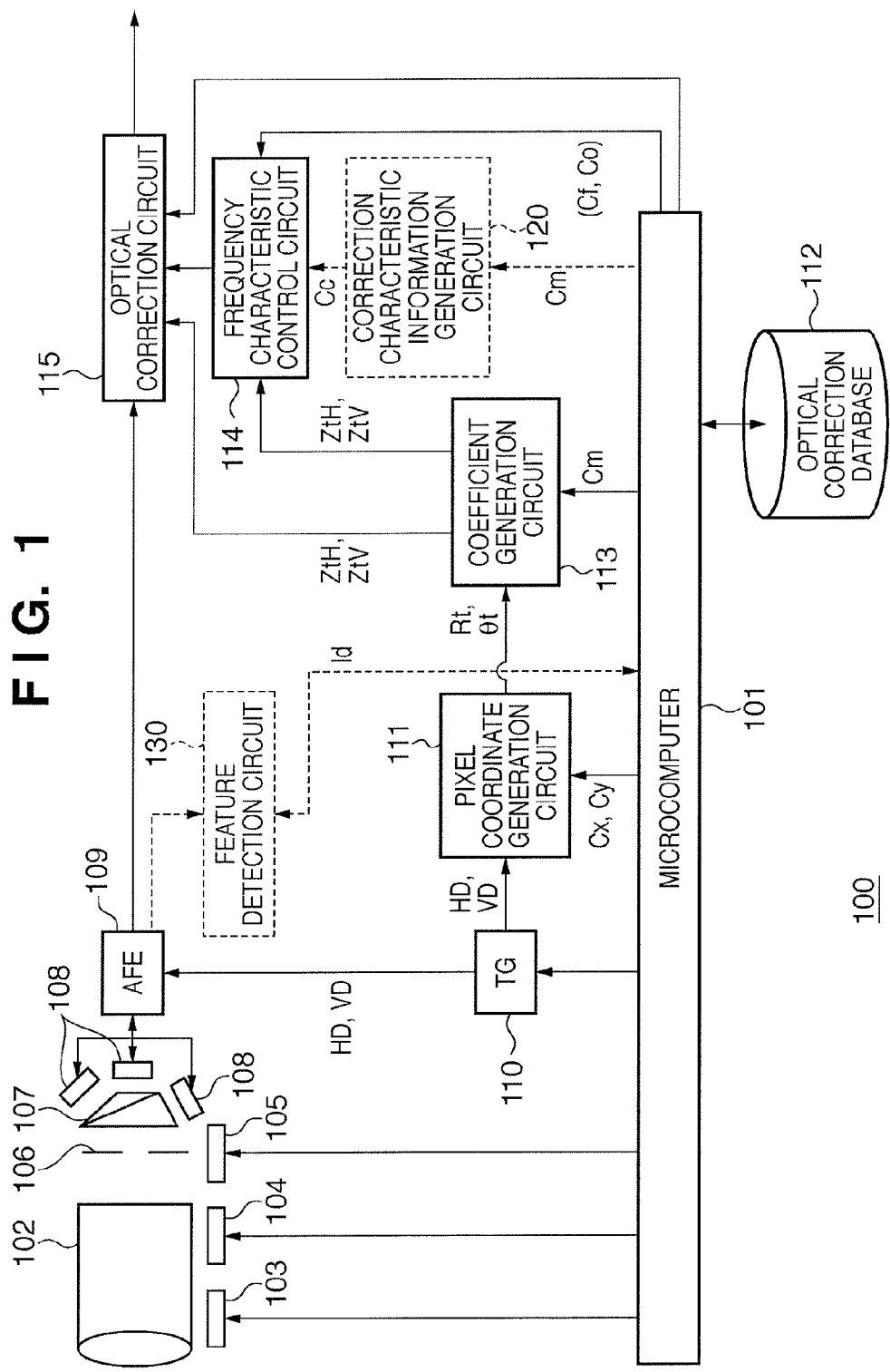

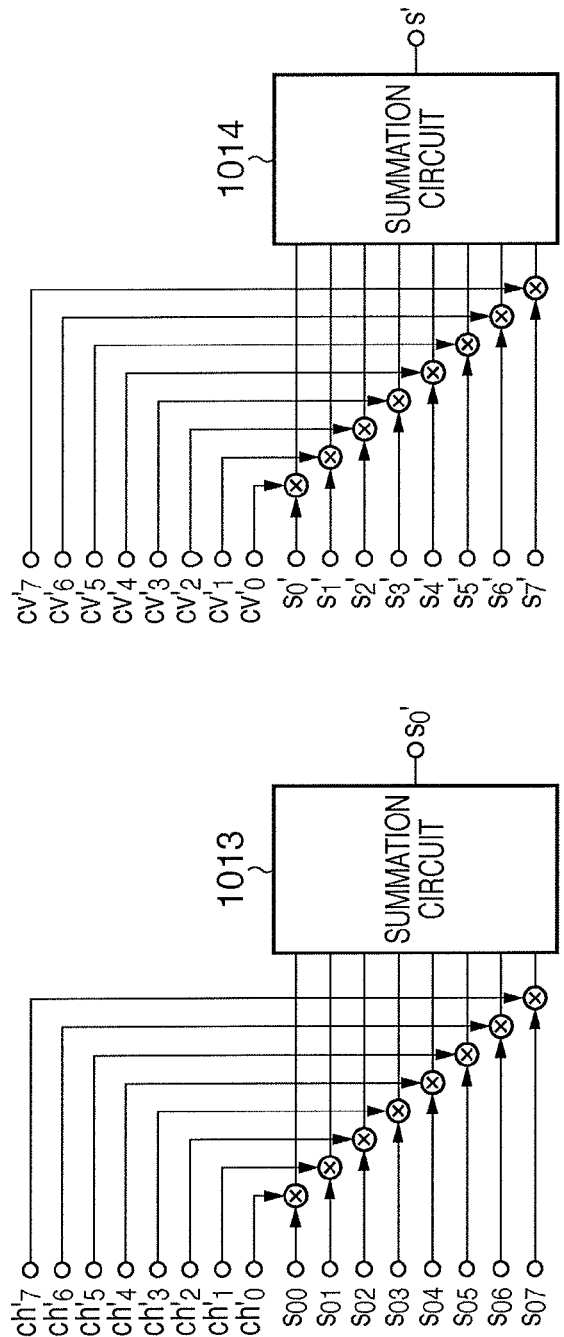

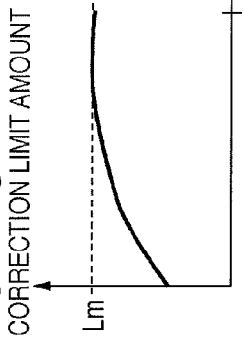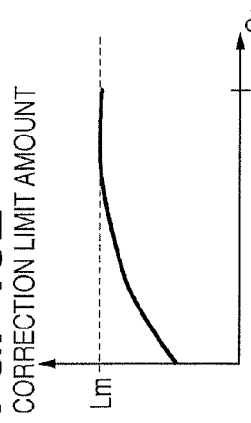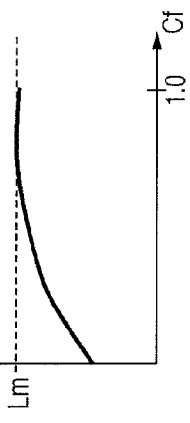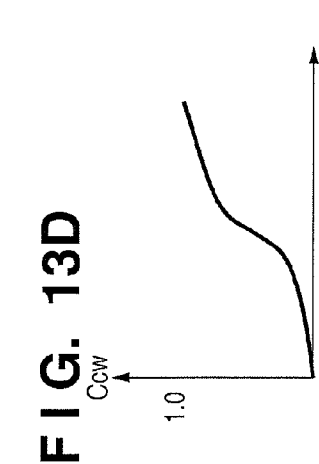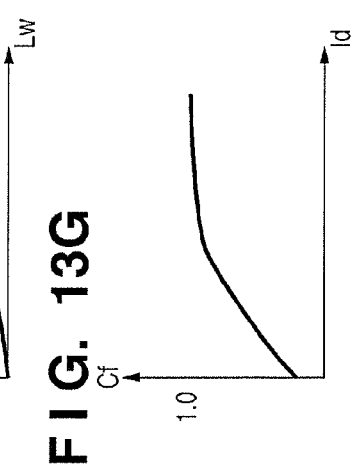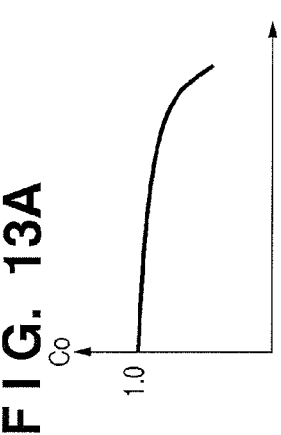

IMAGE PROCESSING APPARATUS FOR CORRECTING IMAGE DEGRADATION CAUSED BY ABERRATIONS AND METHOD OF CONTROLLING THE SAME

This application is a continuation of application Ser. No. 13/045,053, filed Mar. 10, 2011 the entire disclosure of which is hereby incorporated by reference.

BACKGROUND OF THE INVENTION

1. Field of the Invention

The present invention relates to an image correction technique and, more particularly, to a technique of correcting image degradation caused by aberrations in an optical system used to capture an image.

2. Description of the Related Art

An image captured by an image capturing apparatus such as a digital camera is influenced by the chromatic aberration due to magnification and distortion aberration due to an optical system such as an imaging lens. Focusing on the pixels of the captured image reveals that an image that should be formed on a pixel of interest, in an aberration-free system, is moved, by the aberrations, and formed on the line that connects the pixel of interest and the center of the image.

Some recent image capturing apparatuses correct the influence of aberrations by image processing because the use of a multi-pixel image sensor or an optical system with a wide angle or a high zoom ratio makes image quality degradation, caused by the aberrations, apparent. As is known, the correction amount to be used to correct the information defining the pixel, which is moved due to aberration of the pixel, in an aberration-free system, is obtained based on the image height representing the distance from the image center and characteristics of the optical system.

Image movement due to the aberrations is not necessarily done for each pixel of the image sensor. The image is sometimes moved to a point (missing pixel) between the pixels of the image sensor. Hence, an interpolation operation is needed to correct for the influence of the aberrations. Japanese Patent Laid-Open Nos. 2001-186533 and 2005-057605 disclose techniques to derive the pixel value of a pixel of interest after correction by multiplying a plurality of pixels by a correction function so as to correct chromatic aberration due to magnification or distortion aberration in a captured image.

However, the above-described prior art make no mention of the correction limit based on the capacity of the storage area during correction processing, although a processing method of correcting for the influence of aberrations is disclosed. More specifically, in an image capturing apparatus including a multi-pixel image sensor as described above, a captured image is also growing in capacity. For this reason, to apply image processing by, for example, correcting for the influence of aberrations to the obtained image, it is necessary to divide the image into a number of regions, sequentially read out each region to the storage area, and then perform correction processing. In order to shorten the time required from image capturing to recording as in a video recording mode or the like, repetitive region readout needs to be avoided as much as possible. Image processing is required to be completed by the readout of one cycle per region. That is, since the aberration correction amount is limited by the capacity of the storage area, the correction needs to be applied in consideration of the correction limit.

SUMMARY OF THE INVENTION

The present invention has been made in consideration of the problems of the prior arts. The present invention provides for the correction of image quality degradation in a captured image caused by aberrations, due to the optical system, and in consideration of the correction limit.

The present invention in its first aspect provides an image processing apparatus arranged to correct, for each pixel of an image, for the influence of aberrations in an optical system in the image captured using the optical system, comprising: storage unit configured to read out and store an image of a partial region of the image; calculation unit configured to calculate a distance, on the image of the partial region, between a pixel of interest of the image of the partial region stored in the storage unit and an image which should be formed at a position of the pixel of interest but has moved due to the aberrations of the optical system, as a correction amount using information of an image height of the pixel of interest and information of the optical system; and correction unit configured to derive a pixel value of the pixel of interest after correction by adding pixel values obtained by multiplying a pixel value of each of a predetermined number of peripheral pixels, center on a position apart from the pixel of interest by the distance calculated by the calculation unit, by an interpolation coefficient of each of the peripheral pixels obtained from a predetermined interpolation function that is a function of the distance from the position apart from the pixel of interest by the distance calculated by the calculation unit; wherein if the peripheral pixels are stored in the storage unit only in a number smaller than the predetermined number, the correction unit changes the interpolation function so as to make a frequency response behavior of the predetermined interpolation function more moderate than that when the predetermined number of peripheral pixels are stored in the storage unit, and derives the pixel value of the pixel of interest after correction by adding pixel values obtained by multiplying a pixel value of each of the peripheral pixels in the number smaller than the predetermined number by the interpolation coefficient of each of the peripheral pixels obtained from the interpolation function.

Further features of the present invention will become apparent from the following description of exemplary embodiments (with reference to the attached drawings).

BRIEF DESCRIPTION OF THE DRAWINGS

FIG. 1 is a block diagram showing the functional arrangement of a digital camera according to an embodiment of the present invention;

FIGS. 10B and 10C are circuit diagrams showing the circuit arrangement of an interpolation circuit in the optical correction circuit according to an embodiment of the present invention;

FIGS. 13A, 13B, 13C, 13D, 13E, 13F, 13G, and 13H are graphs showing the relationship between the correction limit amount and each of the parameters according to an embodiment of the present invention;

DESCRIPTION OF THE EMBODIMENTS

First Embodiment

Figure 2A:
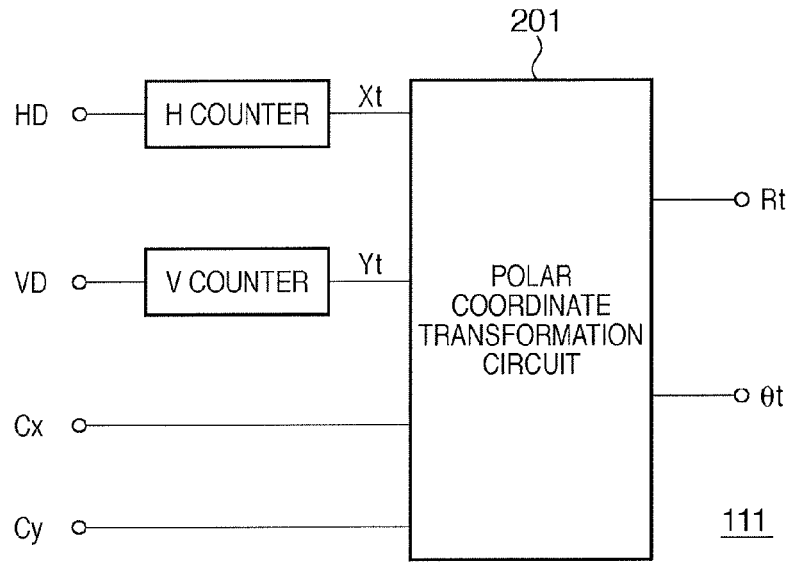
FIGS. 2A and 2B are views for explaining a pixel coordinate generation circuit according to the embodiment of the present invention.

An embodiment of the present invention will now be described in detail with reference to the accompanying drawings. Note that in the following embodiment, an example will be described in which the present invention is applied to a digital camera that is an image processing apparatus and can correct chromatic aberration due to magnification or distortion aberration generated in a captured image due to the optical system. However, the present invention is applicable to a device capable of correcting image quality degradation caused in an input image by the aberrations of the optical system that captured the image.

Note that in this embodiment, the correction amount of the chromatic aberration due to magnification of each of RGB or the distortion aberration will be described below because the aberration correction amount depends on the image height, although the relationship between the correction amount and the image height is different between the chromatic aberration due to magnification and the distortion aberration.

FIG. 1 is a block diagram showing the functional arrangement of a digital camera 100 according to an embodiment of the present invention. Note that in this embodiment, the description will be made by illustrating at least only the functional arrangement necessary for correcting the influence of aberrations generated in an image captured by the digital camera 100, and no components concerning image recording and display are illustrated.

A microcomputer 101 is a block that controls the overall processing for the digital camera 100 and performs calculations and transfers data such as a calculation result to the other blocks. The microcomputer 101 incorporates a nonvolatile memory that stores operation programs associated with the entire processing of the digital camera 100, and a work memory that executes the operation programs and temporarily stores calculation results and input data.

An optical system 102 includes lenses such as a zoom lens and a focus lens. Light reflected by an object and received via the optical system 102 and an aperture 106 forms an image of the object, herein called an object image, on the image sensors 108 to be described later. The optical system 102 and the aperture 106 are driven by a zoom lens actuator 103, focus lens actuator 104, and aperture actuator 105 in accordance with driving position information supplied from the microcomputer 101 so as to optically adjust the object image. A focal length, focus position, and aperture value are included in the information to be used to calculate the driving position information to be supplied to the optical system 102. The position of the lenses 102 and aperture 106 are factors that affect the chromatic aberration due to magnification and the distortion aberration, and will be generically referred to as optical parameters in the following description of the correction for the influence of such aberrations.

The reflected light from the object, which enters the digital camera 100 via the optical system 102 and the aperture 106, is separated by a color separation prism 107 into RGB to form an image on the image sensor 108 for each of RGB. Each image sensor 108 is formed from a CCD, a CMOS sensor, or the like. The optical image formed on each image sensor 108 is photoelectrically converted. The resultant analog image signals are output to an analog front end (AFE) 109 in scanning order in accordance with driving waveforms input from the AFE 109. The AFE 109 is a block that converts an input analog image signal into a digital image signal. The AFE 109 converts the analog image signals input from the image sensors 108 for RGB into digital image signals Sr, Sg, and Sb and outputs them to an optical correction circuit 115 to be described later. The driving waveforms of the image sensors 108 generated by the AFE 109 to cause the image sensors 108 to output the analog image signals depend on a horizontal synchronizing signal HD and a vertical synchronizing signal VD output from a timing generator (TG) 110 to the AFE 109. The TG 110 receives, from the microcomputer 101, information concerning driving of the image sensors 108 provided in the digital camera 100, and generates the horizontal synchronizing signal HD and the vertical synchronizing signal VD, and outputs them to the AFE 109 and a pixel coordinate generation circuit 111. The information concerning driving of the image sensors 108 includes, for example, information regarding the time necessary for the image sensors 108 to output the analog image signals within one horizontal line and information regarding the time required to output all analog image signals, that is, read out the analog image signals within one frame.

The pixel coordinate generation circuit 111 converts the information regarding each pixel position into polar coordinates in order to correct for the influence of aberrations. The chromatic aberration due to magnification and distortion aberration depend on the image height that is the distance from the optical center. Hence, the pixel coordinate generation circuit 111 converts the information regarding each pixel position into polar coordinates using the optical center as the pole. The pixel coordinate generation circuit 111 will be described in more detail with reference to FIGS. 2A and 2B.

FIG. 2A shows an example of the circuit arrangement of the pixel coordinate generation circuit 111. The horizontal synchronizing signals HD and the vertical synchronizing signals VD input from the TG 110 are counted to obtain pieces of information Xt and Yt about the pixel positions currently output from the image sensor 108 to the AFE 109. The pieces of information Xt and Yt are input to a polar coordinate transformation circuit 201. In addition, pieces of information Cx and Cy of the pixel position of the optical center of the captured image are supplied from the microcomputer 101 and input to the polar coordinate transformation circuit 201.

Figure 2B:
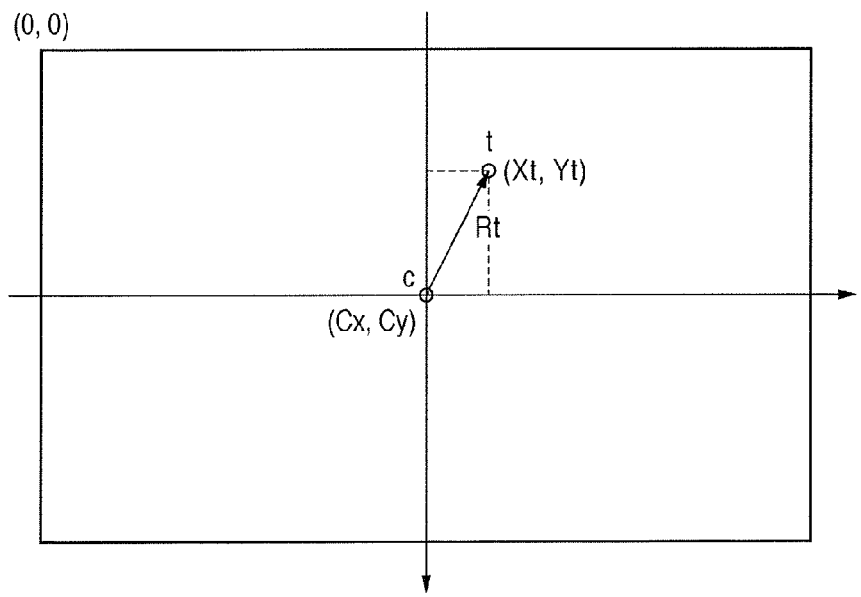

Based on the pieces of input information, the polar coordinate transformation circuit 201 calculates the information of a moving radius Rt and argument θt representing the polar coordinates of the pixel currently output to the AFE 109 as shown in FIG. 2B by $$Rt = \sqrt{(Xt - Cx)^2 + (Yt - Cy)^2}$$

$$\theta t = \arctan\left(\frac{Yt - Cy}{Xt - Cx}\right)$$

The thus calculated polar coordinate information is output to a coefficient generation circuit 113 to be described later. Note that by expressing a known method such as the bisection algorithm or extraction of square root at the finite word length accuracy, the square root operation can also be implemented by hardware, whereas the arctan operation can also be implemented by hardware using high-order function approximation or piecewise low-order function approximation that divides the XY ratio into predetermined ranges.

An optical correction database 112 is a storage device such as a flash memory that stores optical correction characteristic information for the aberrations of the optical system, that is, the above-described optical parameters in the image capturing mode. Since the storage capacity of the optical correction database 112 is finite, the optical correction characteristic information is stored as, for example, plot data representing the correction amounts of chromatic aberration of magnification and distortion aberration of each color at discrete image height positions for a preset optical parameter combination. That is, to calculate a correction amount for an optical parameter combination and image height position which is not stored as optical correction characteristic information, the approximate function of the correction amount and image height needs to be obtained from the optical correction characteristic information stored in the optical correction database 112 by interpolation.

Figure 3A:
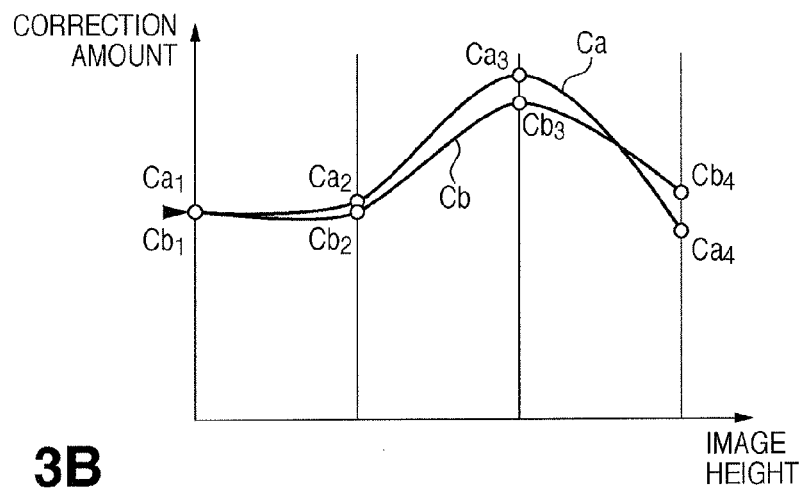
FIGS. 3A, 3B, and 3C are graphs explaining an approximate function deriving method to be used to calculate a correction amount in accordance with the present invention.
Figure 3B:
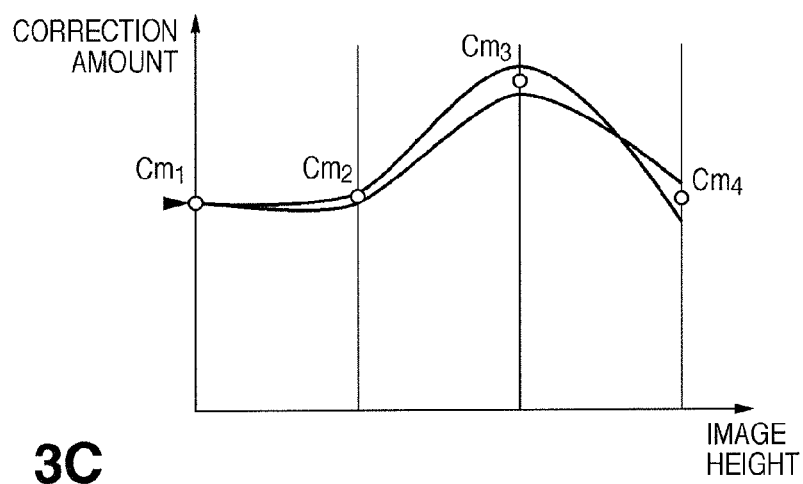

A method of causing the microcomputer 101 to calculate plot data Cm1 to Cm4 of the approximate function of the correction amount and image height suitable for the optical parameters in the image capturing mode from the optical correction characteristic information stored in the optical correction database 112 will be described with reference to FIGS. 3A to 3C.

When image capturing has been performed in accordance with, for example, a user instruction, the microcomputer 101 acquires the optical parameters at the time of image capturing and also reads out, from the optical correction database 112, two pieces of optical correction characteristic information Ca and Cb that are similar to the combination of optical parameters at the time of image capturing. The pieces of readout optical correction characteristic information include plot data Ca1 to Ca4 and Cb1 to Cb4 representing correction amounts at four image height positions in two different approximate functions, as shown in FIG. 3A. Note that although the plot data in FIG. 3A are connected by curves to identify the pieces of optical correction characteristic information Ca and Cb, actual plot data include no data between plots. The microcomputer 101 weights the data in accordance with the degree of deviation between the optical parameters at the time of image capturing and those of the two pieces of readout optical correction characteristic information Ca and Cb, and calculates optical correction characteristic information of the optical parameters at the time of image capturing from the two pieces of optical characteristic information as shown in FIG. 3B. The microcomputer 101 outputs the plot data Cm1 to Cm4 calculated from the two pieces of optical correction characteristic information Ca and Cb to the coefficient generation circuit 113 as the optical correction characteristic information of the optical parameters at the time of image capturing.

The coefficient generation circuit 113 derives, from input plot data Cm of the optical correction characteristic information of the optical parameters at the time of image capturing, the approximate function of the correction amount and image height in each plot section for the optical parameters at the time of image capturing. The coefficient generation circuit 113 also calculates the correction amount for the influence of aberrations of the optical system 102 at the input pixel position using the derived approximate function of the correction amount and image height.

Figure 4:
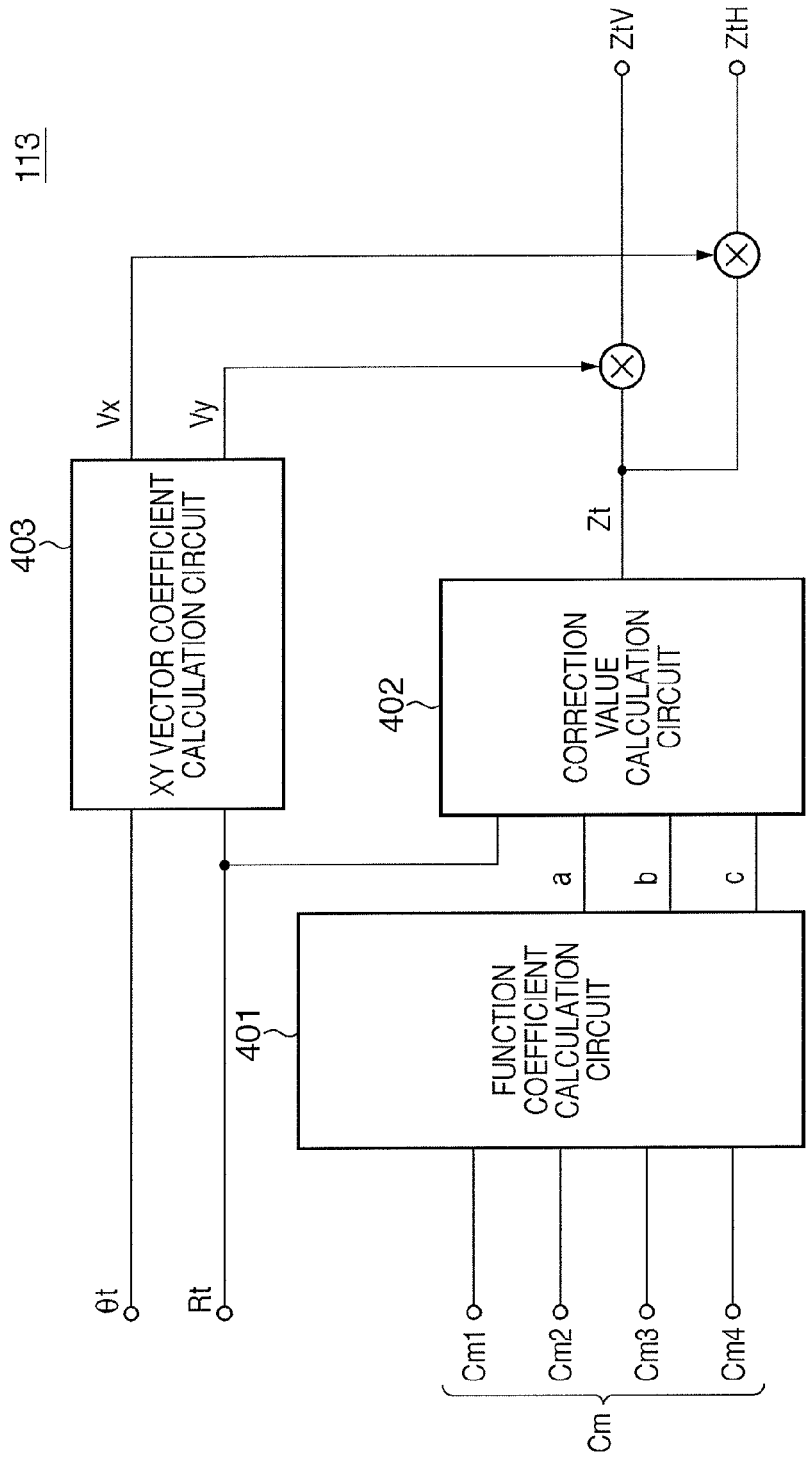
FIG. 4 is a block diagram showing the circuit arrangement of a coefficient generation circuit according to an embodiment of the present invention.

The circuit arrangement of the coefficient generation circuit 113 will be explained here with reference to FIG. 4. The coefficient generation circuit 113 includes a function coefficient calculation circuit 401, correction value calculation circuit 402, and XY vector coefficient calculation circuit 403.

Based on the plot data of the optical correction characteristic information of the optical parameters at the time of image capturing, the function coefficient calculation circuit 401 calculates the coefficients of the approximate function of the correction amount and image height in each plot section. In this embodiment, the function coefficient calculation circuit 401 derives the approximate function between the plots from the plot data of the optical correction characteristic information as the quadratic function of the image height Rt given by $$Zt = a \cdot Rt^2 + b \cdot Rt + c$$

That is, the function coefficient calculation circuit 401 outputs three coefficients a, b, and c of the derived approximate function to the correction value calculation circuit 402.

Note that although a method of deriving the approximate function of the correction amount and image height as a quadratic function will be described in this embodiment, the approximate function may be approximated by a linear function or a high-order function. For example, if the approximate function is a cubic function, four coefficients are output to the correction value calculation circuit 402. Note that although a method of causing the function coefficient calculation circuit 401 to derive the approximate function of the correction amount and image height from the plot data will be described in this embodiment, the optical correction database 112 may store the coefficients of approximate functions of the respective optical parameters. In this case, the coefficient generation circuit 113 may omit the function coefficient calculation circuit 401 if the coefficients of the approximate function of the optical parameters at the time of image capturing, which are input to the coefficient generation circuit 113, are directly input to the correction value calculation circuit 402.

Figure 3C:
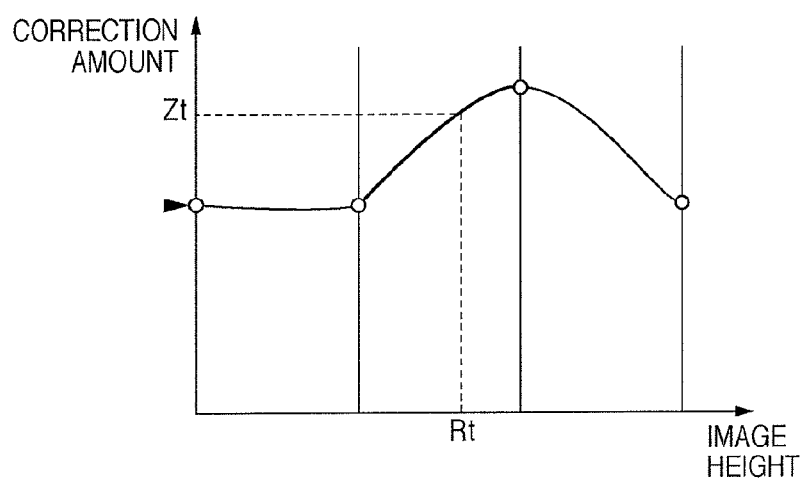

The correction value calculation circuit 402 calculates a correction amount Zt of the pixel of interest, as shown in FIG. 3C, from the coefficients of the approximate function in each plot section input from the function coefficient calculation circuit 401 and the information of the image height of the pixel of interest input from the pixel coordinate generation circuit 111 to the coefficient generation circuit 113. Note that the correction amount Zt calculated by the correction value calculation circuit 402 is the correction amount on the line segment that connects the pixel of interest and the pole on the polar coordinate system. For conversion from the polar coordinate system to the XY coordinate system, it is necessary to multiply the correction amount by vector coefficients output from the XY vector coefficient calculation circuit 403.

The XY vector coefficient calculation circuit 403 calculates vector coefficients to be used to convert the correction amount calculated on the polar coordinate system to a correction amount on the XY coordinate system. More specifically, based on the information of the argument θt of the pixel of interest input from the pixel coordinate generation circuit 111 to the coefficient generation circuit 113, the XY vector coefficient calculation circuit 403 calculates vector coefficients by $$Vx = \cos \theta t$$

$$Vy = \sin \theta t$$

Note that the sine function and cosine function operations can also be implemented by hardware using high-order function approximation or piecewise low-order function approximation that divides the argument θt into predetermined ranges.

Using the vector coefficients thus calculated by the XY vector coefficient calculation circuit 403, the coefficient generation circuit 113 calculates an X component ZtH and a Y component ZtV of the correction amount on the XY coordinate system which are given by $$ZtH = Zt \cdot Vx$$

$$ZtV = Zt \cdot Vy$$

The coefficient generation circuit 113 outputs the calculated X and Y components ZtH and ZtV of the correction amount to a frequency characteristic control circuit 114 to be described later and the optical correction circuit 115. Note that the correction amount at the pixel of interest represents the phase shift amount of the optical image that should exist at the pixel of interest, and the X and Y components of the correction amount represent the horizontal and vertical phase shift components. The correction amount of chromatic aberration of magnification changes between the digital images Sr, Sg, and Sb because the angle of refraction by the optical system 102 changes between RGB. However, the correction amount of distortion aberration has the same value for the digital images Sr, Sg, and Sb.

The optical correction circuit 115 performs an interpolation operation from the pixel values of peripheral pixels around a position apart from the pixel of interest by the distance corresponding to the correction amount calculated by the coefficient generation circuit 113 on the captured image, thereby calculating the pixel value of the pixel of interest after correcting the influence of aberrations. More specifically, the pixel values of a predetermined number of peripheral pixels around a position apart from the pixel of interest by the distance corresponding to the X and Y components ZtH and ZtV of the correction amount of the pixel of interest calculated by the coefficient generation circuit 113 are multiplied by interpolation coefficients obtained from an interpolation function, thereby deriving the pixel value at the position of the pixel of interest after correction. This allows the optical correction circuit 115 to perform the interpolation operation using the interpolation coefficients for all pixels of the input digital image and output an image which has undergone correction of the influence of aberrations.

The interpolation function and the aberration correction method of this embodiment using the interpolation function will be described below in detail with reference to the accompanying drawings.

The interpolation function is a finite function obtained by superimposing a window function on a sin c function so as to be used for Bi-Cubic interpolation, which can derive interpolation coefficients to multiply the respective pixels (reference pixels) within the range defined by the window function when correcting the influence of aberrations. A pixel value s' of a ideal pixel S' that should form an image at a pixel S of interest can be obtained by multiplying the pixel values of n reference pixels $S_0$ to $S_{n-1}$ around the ideal pixel S' by interpolation coefficients and adding the pixel values. Using the pixel values $S_0$ to $S_{n-1}$ of the n reference pixels and interpolation coefficients $C_0$ to $C_{n-1}$ to multiply the reference pixels, the pixel value s' of the ideal pixel is given by $$s' = \sum_{j=0}^{n-1} c_j \cdot s_j$$

Note that in this embodiment, information that specifies a pixel is represented by an uppercase alphabetic letter, and its pixel value is represented by a corresponding lowercase alphabetic letter, like the ideal pixel S' and its pixel value s'.

Figure 5:
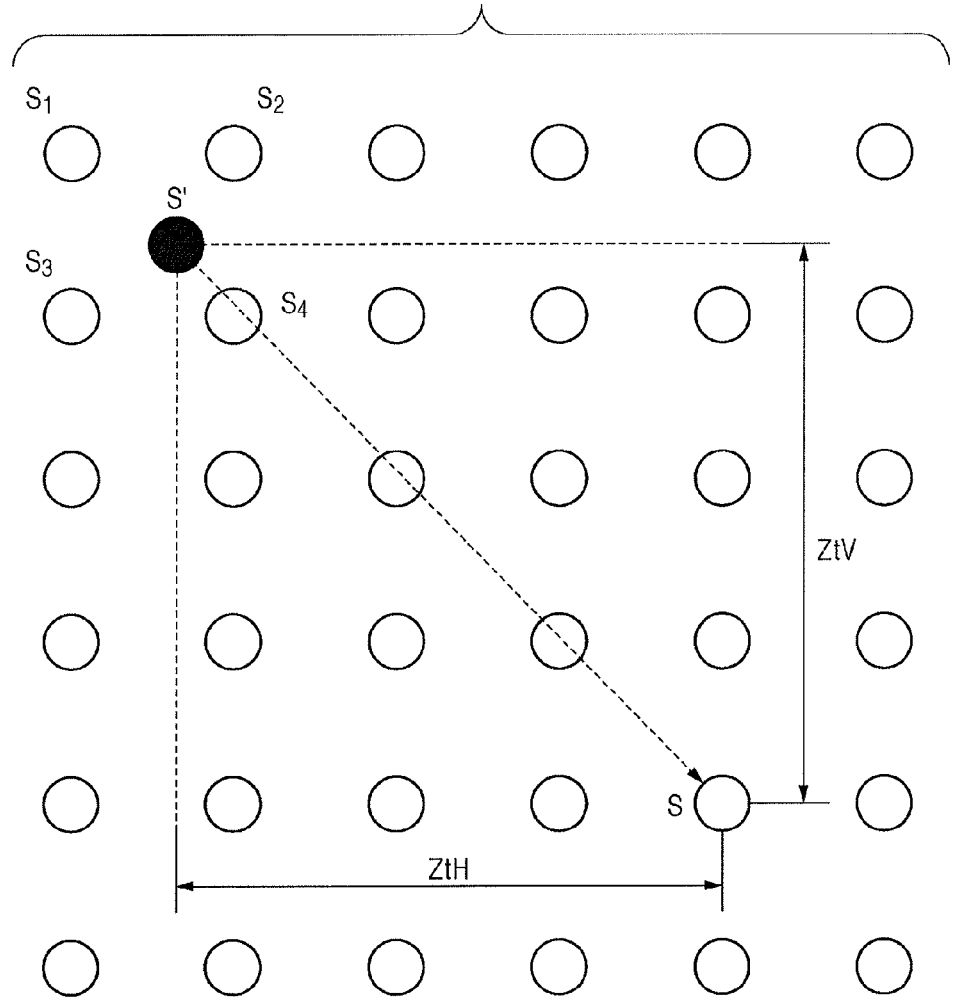
FIG. 5 is a view explaining a method of deriving a pixel value after correction.

Assume that the pixel S of interest and the ideal pixel S' hold a positional relationship as shown in FIG. 5. If the number of reference pixels is four, the pixel value s' of the ideal pixel is derived using four reference pixels $S_1$ to $S_4$ around the ideal pixel S'. Interpolation coefficients derived by an interpolation function at this time have values, for example, inversely proportional to the distances of the reference pixels from the ideal pixel S' so that the pixel $S_4$ closest to the ideal pixel S' is most weighted.

Figure 6:
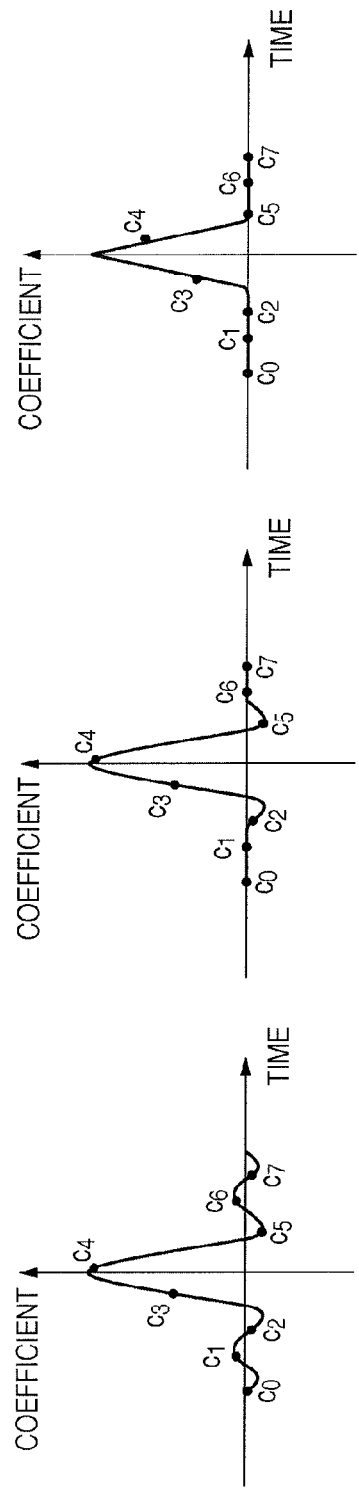
FIGS. 6A, 6B, and 6C are graphs explaining the temporal characteristics of interpolation functions.
FIGS. 6D, 6E, and 6F are graphs explaining the frequency response behaviors of interpolation functions.

FIGS. 6A, 6B, and 6C show examples of the temporal characteristic of 8-point interpolation. The window function narrows in the order of FIGS. 6A, 6B, and 6C, and so does the interval between the eight pixels to be referred. FIGS. 6A, 6B, and 6C illustrate the values of interpolation coefficients $c_0$ to $c_7$ corresponding to the pixels with a phase delay or advance with respect to the correction phase represented by time 0.

FIGS. 6D, 6E, and 6F show examples of the frequency characteristics of the interpolation functions. The frequency response behaviors near the Nyquist frequency are different. When the window function is wide, as shown in FIG. 6D, the frequency response behavior near the Nyquist frequency is steep. For this reason, correcting the influence of aberrations using interpolation coefficients obtained from such an interpolation function enables to obtain pixel values of high reproducibility. When the window function is narrow, as shown in FIG. 6F, the frequency response behavior near the Nyquist frequency is moderate. For this reason, correcting the influence of aberrations using interpolation coefficients obtained from such an interpolation function makes the pixel value reproducibility lower.

In this embodiment, the frequency characteristic control circuit 114 is provided to control the frequency characteristic of the interpolation coefficients to be used for the interpolation operation of the optical correction circuit 115. The circuit arrangement of the frequency characteristic control circuit 114 will be described with reference to FIG. 7.

Upon receiving the X and Y components ZtH and ZtV of the aberration correction amount input from the coefficient generation circuit 113, the frequency characteristic control circuit 114 outputs, to the optical correction circuit 115, suppression coefficients to be used to control the frequency characteristic of the interpolation coefficients for the horizontal and vertical directions. More specifically, upon receiving the aberration correction amount, the frequency characteristic control circuit 114 determines suppression coefficients ItHa, ItHb, and ItHc and ItVa, ItVb, and ItVc using coefficient function calculation circuits 701 to 703 for the horizontal and vertical correction amounts. Note that since the suppression coefficients are values determined by the correction limit independently of the direction, the horizontal suppression coefficients of the interpolation function will be described below in this embodiment.

Figure 8A:
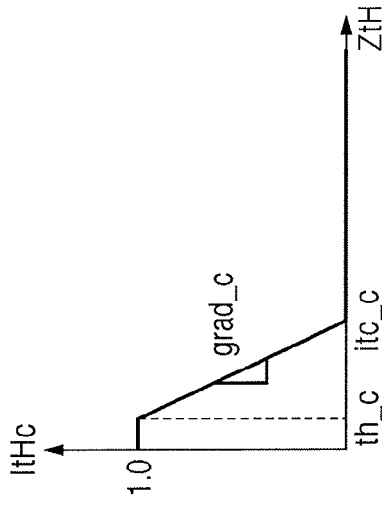
FIGS. 8A, 8B, and 8C are graphs explaining the suppression coefficients of the interpolation function.
Figure 8B:
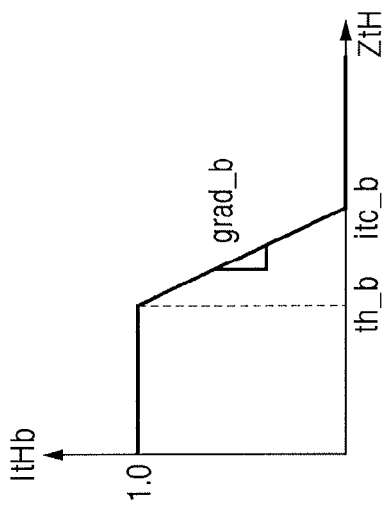
Figure 8C:
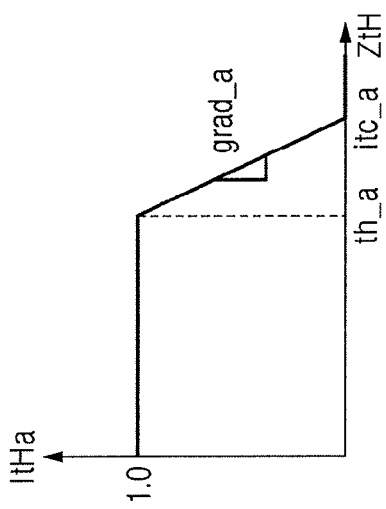

The suppression coefficients ItHa, ItHb, and ItHc are the functions of the aberration correction amount ZtH which change the behaviors at thresholds th_a, th_b, and th_c as shown in FIGS. 8A to 8C. The coefficient function calculation circuits 701 to 703 receive, for example, the threshold information and gradients grad_a, grad_b, and grad_c for the correction amount ZtH larger than the thresholds from the microcomputer 101, and determine the suppression coefficients based on the value of the correction amount.

For example, when the image of a partial region of the captured image is read out to the finite storage area of the optical correction circuit 115, it is generally possible to adopt, in the storage area, a lot of reference pixels around the ideal pixel in the correction processing for a smaller aberration correction amount. That is, the window function of the interpolation function needs to be wider for a smaller correction amount or narrower for a larger correction amount. When correcting eight horizontal reference pixels around the ideal pixel S', as shown in FIGS. 6A to 6C, interpolation coefficients ch' obtained by controlling the frequency characteristic of the interpolation function are given, using the suppression coefficients and interpolation coefficients ch obtained from the interpolation function without frequency characteristic control, by $$ch'j=chj(j=3,4)$$

$$ch'j=chj \times ItHa(j=2,5)$$

$$ch'j=chj \times ItHb(j=1,6)$$

$$ch'j=chj \times ItHc(j=0,7)$$

At this time, to make the interpolation coefficients ch' obtained by controlling the frequency characteristic of the interpolation function control the range of the window function based on the correction amount ZtH as shown in FIGS. 6A to 6C, the microcomputer 101 controls the parameters to be supplied to the frequency characteristic control circuit 114 such that the threshold th_a, th_b, and th_c hold a relation given by $$0 \le th\_c \le th\_b \le th\_a$$

and X-intercepts itc_a, itc_b, and itc_c calculated by the gradients grad_a, grad_b, and grad_c hold a relation given by $$0 \le itc\_c \le itc\_b \le itc\_a$$

The frequency characteristic control circuit 114 outputs the suppression coefficients of the interpolation function thus determined based on the aberration correction amount to the optical correction circuit 115.

Figure 9:
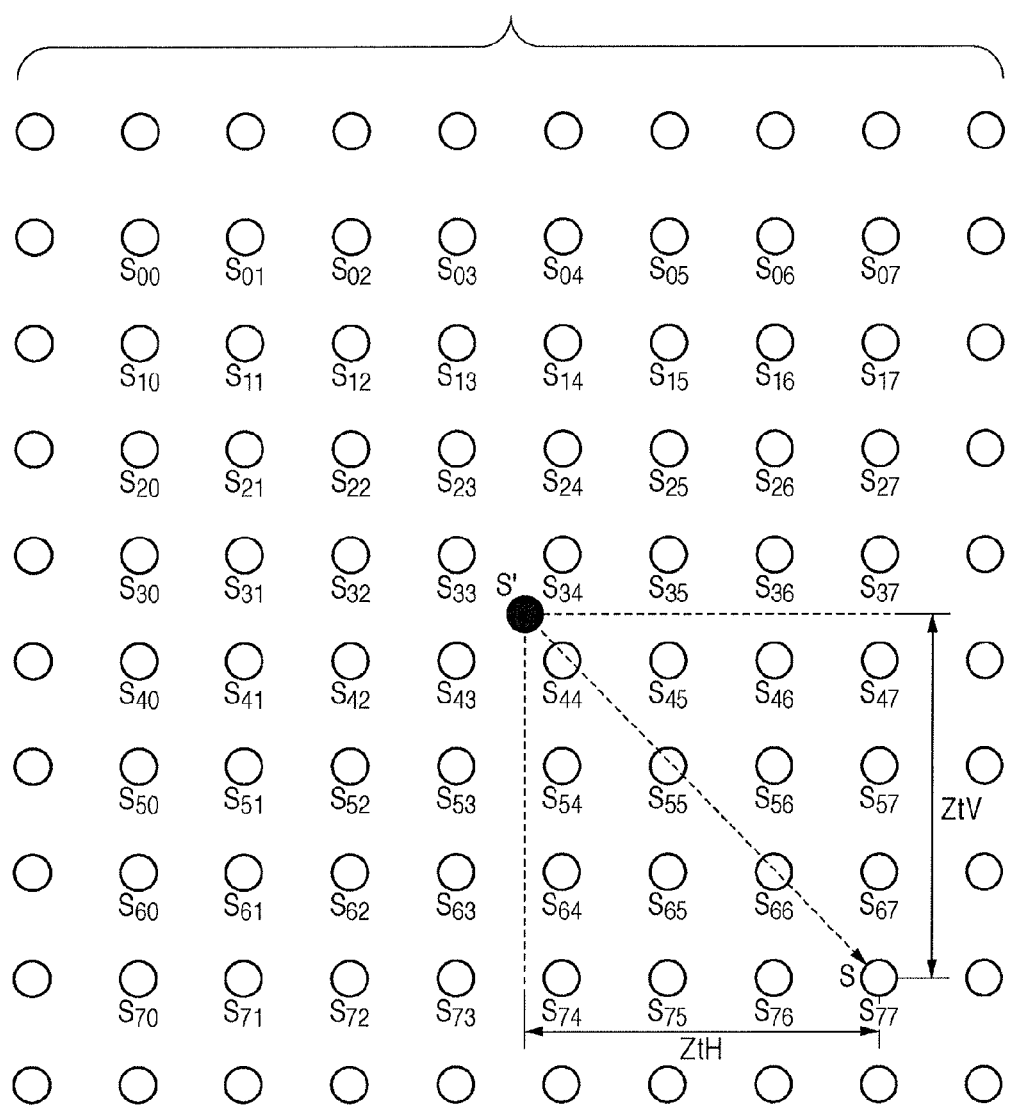
FIG. 9 is a view explaining a method of deriving a pixel value after correction according to an embodiment of the present invention.

A method of deriving the pixel values after correction, which is performed by the optical correction circuit 115 using the suppression coefficients determined by the frequency characteristic control circuit 114, will be described next in detail with reference to the accompanying drawings. Note that the method of deriving the pixel values after correction will be described below as a method of deriving the pixel value of the ideal pixel S' using, as the reference pixels, 8×8 peripheral pixels around the position of the ideal pixel S' apart from the pixel S of interest by the distance corresponding to the correction amount calculated by the coefficient generation circuit 113. More specifically, as shown in FIG. 9, to derive the pixel value of the ideal pixel S' which exists at the pixel position apart from the pixel S of interest by the distance defined by the correction amount ZtH on the horizontal coordinate and the correction amount ZtV on the vertical coordinate, 64 pixels $S_{00}$ to $S_{77}$ around the ideal pixel S' are used as the reference pixels. However, implementation of the present invention is not limited to this, and any other method of deriving the pixel value of the ideal pixel S' using two or more peripheral pixels in an arbitrary number as the reference pixel is applicable.

The circuit arrangement of the optical correction circuit 115 will be described here with reference to FIGS. 10R, 10B, and 10C.

The aberration correction amounts ZLH and ZtV input from the coefficient generation circuit 113 and the suppression coefficients ItHa to ItHc and ItVa to ItVc input from the frequency characteristic control circuit 114 are input to interpolation control circuits 1001 and 1002 while making a distinction between the vertical and horizontal components. The interpolation control circuit 1001 calculates the interpolation coefficients of the vertical component. The interpolation control circuit 1001 outputs interpolation coefficients $cv_0$ to $cv_7$ to an interpolation circuit 1012 using the interpolation function and the input suppression coefficients. The interpolation control circuit 1001 also transmits the information of the input vertical correction amount ZtV to a buffer memory 1003. The interpolation control circuit 1002 calculates the interpolation coefficients of the horizontal component. The interpolation control circuit 1002 outputs interpolation coefficients $ch_0$ to $ch_7$ to interpolation circuits 1004 to 1011, respectively, using the interpolation coefficients and the input suppression coefficients. The interpolation control circuit 1002 also transmits the information of the input horizontal correction amount ZtH to the buffer memory 1003.

The buffer memory 1003 is a storage area for storing the image of a partial region of the digital images Sr, Sg, and Sb converted by the AFE 109 for correction processing. The buffer memory 1003 stores the images sequentially converted by the AFE 109. When the horizontal and vertical correction amounts ZtH and ZtV are input to the buffer memory 1003, the microcomputer 101 calculates the position of the ideal pixel S' apart from the pixel S of interest of the image stored in the buffer memory 1003 by the distance defined by the correction amounts. The microcomputer 101 also determines a predetermined number of peripheral pixels around the calculated pixel position of the ideal pixel S', and outputs the pixel values of the determined peripheral pixels to the interpolation circuits 1004 to 1011 so that the pixel values are processed by different interpolation circuits for the respective vertical coordinates. For example, the pixel values $s_{00}$ to $s_{01}$ of the reference pixels in FIG. 9 are output to the interpolation circuit 1004.

Figure 10A:
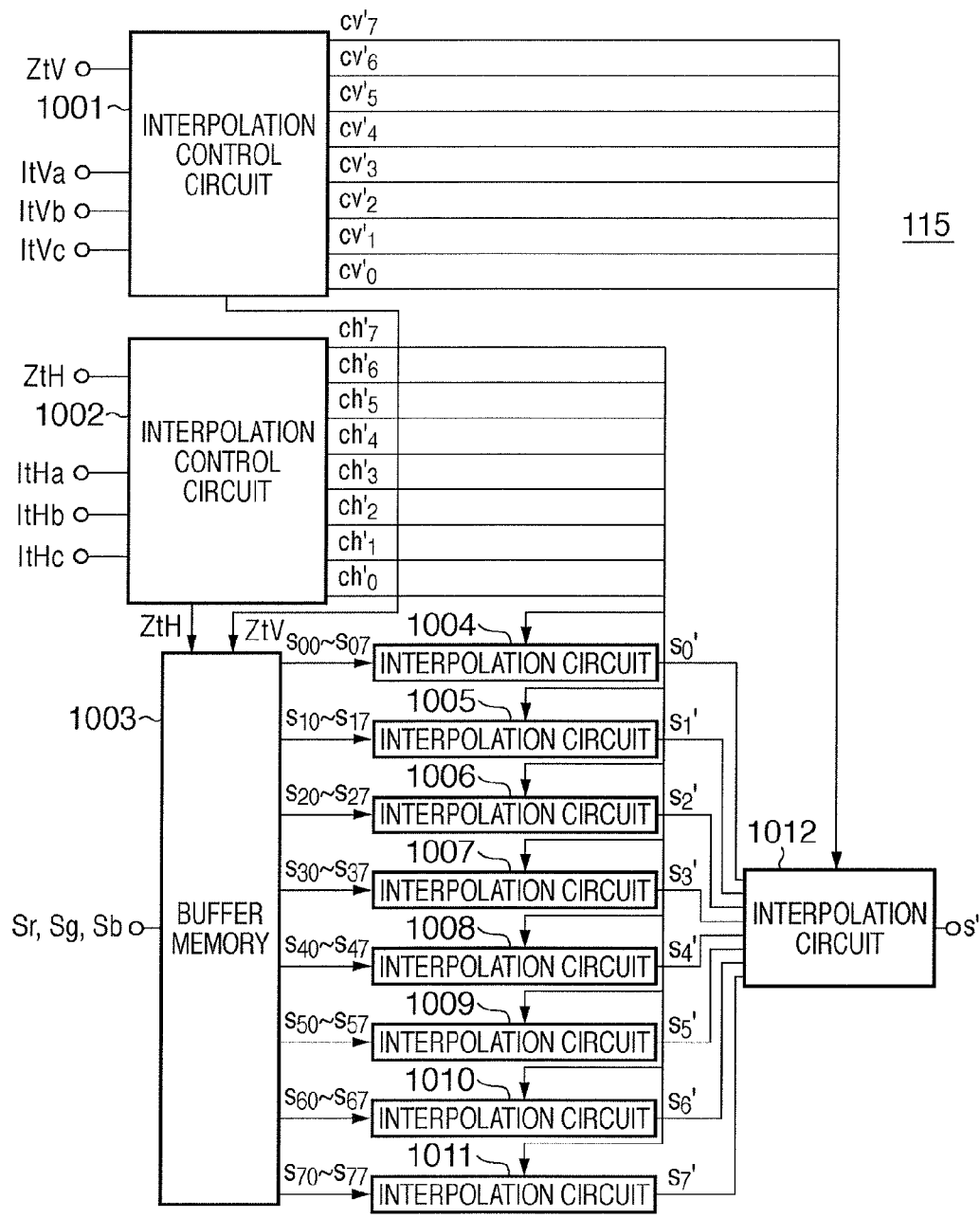
FIG. 10A is a block diagram showing the circuit arrangement of an optical correction circuit according to an embodiment of the present invention.

FIG. 10B illustrates the arrangement of each of the interpolation circuits 1004 to 1011. FIG. 10C illustrates the arrangement of the interpolation circuit 1012. As shown in FIG. 10B, each interpolation circuit multiplies the pixel values of the reference pixels having the same vertical coordinate by interpolation coefficients $ch'_0$ to $ch'_7$ corresponding to the horizontal pixel positions, and outputs the products to an summation circuit 1013. The summation circuit 1013 calculates the total sum of the pixel values of the reference pixels multiplied by the interpolation coefficients and outputs a horizontal interpolation value. Horizontal interpolation values $s_0'$ to $s_7'$, which are obtained from the pixel values of the reference pixels having the same vertical coordinate and having undergone a horizontal interpolation operation and output from the interpolation circuits 1004 to 1011, are output to the interpolation circuit 1012 to perform a vertical interpolation operation. As shown in FIG. 10C, the interpolation circuit 1012 multiplies the horizontal interpolation values of the pixel values that have undergone the horizontal interpolation operation by interpolation coefficients $cv'_0$ to $cv'_7$ corresponding to the vertical pixel positions, and outputs the products to an summation circuit 1014. The summation circuit 1014 calculates and outputs the interpolation value s' that is the total sum of the pixel values of all the reference pixels multiplied by the interpolation coefficients. Note that the above-described interpolation operation of calculating the average value s' of interpolation values via the interpolation circuits of two stages can also be represented by $$s' = \sum_{j=0}^{7} cv_j \cdot \left( \sum_{k=0}^{7} ch_k \cdot s_{jk} \right)$$

This enables to derive the pixel value of an optical image that should be formed at the pixel of interest. Hence, applying the correction processing of the optical correction circuit 115 to all pixels allows to correct image quality degradation caused by the aberrations.

Note that when applying the correction processing of the optical correction circuit 115 to all pixels, the following problem may arise depending on the capacity of the buffer memory 1003, the magnitude of the correction amount, and the position of the pixel of interest.

In the correction processing, the interpolation operation is performed by referring to a predetermined number of peripheral pixels around the ideal pixel apart from the pixel of interest stored in the buffer memory 1003 by the distance corresponding to the correction amount calculated by the coefficient generation circuit 113. At this time, situations as shown in FIGS. 11B, 11C, and 11D may occur in which at least any of the predetermined number of peripheral pixels around the ideal pixel are not read out to the buffer memory 1003. In such a case, the accuracy of the interpolation operation lowers in correspondence with the number of pixel values that cannot be referred to, resulting in image quality degradation more than necessary in the corrected image.

In this embodiment, a method will be described below, which implements correction of the influence of aberrations when the storage unit that reads out and stores the image of a partial region does not store a predetermined number of peripheral pixels around the position of a pixel which should form an image at the pixel of interest, as described above.

Figure 11A:
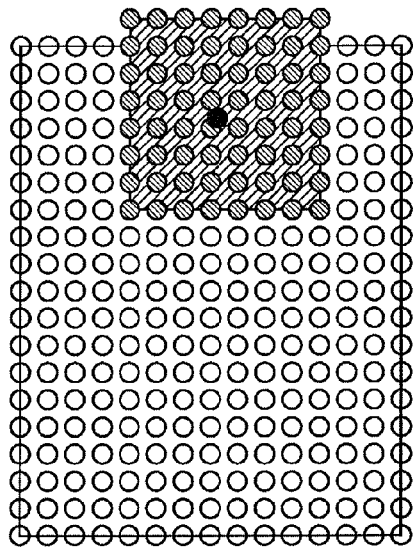
FIGS. 11A, 11B, 11C, and 11D are views explaining reference pixels on a buffer memory to be used for an interpolation operation.
Figure 11B:
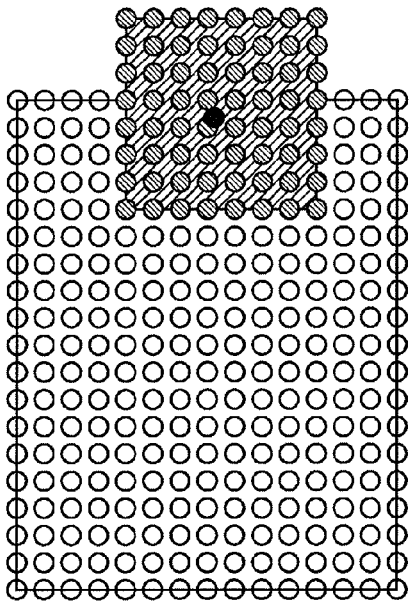
Figure 11C:
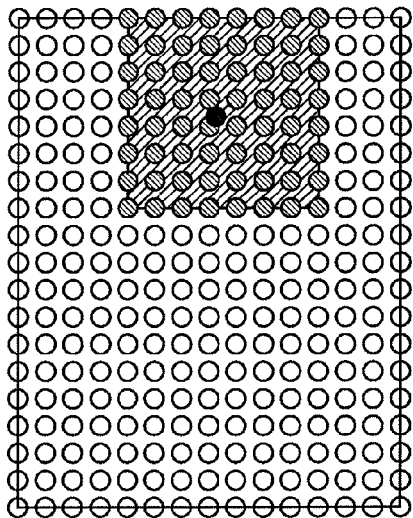
Figure 11D:
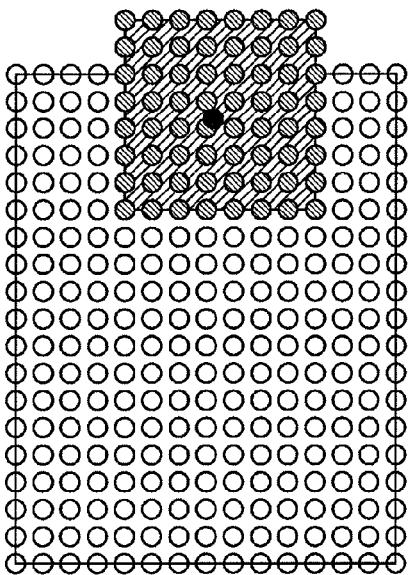

FIG. 11A shows a horizontal correction limit in which the interpolation operation can be performed using a predetermined number of peripheral pixels around a position apart from, for example, a given pixel S of interest by the distance corresponding to the aberration correction amount. More specifically, for a correction amount larger than a horizontal component $ZtH_{max}$ of the aberration correction amount at this time, pixels that are not stored in the storage unit are referred to in the interpolation operation, as shown in FIGS. 11B, 11C, and 11D. Hence, the interpolation function is controlled in the following way.

If one pixel line of the reference pixel range horizontally extends off the region of the image stored in the storage unit, as shown in FIG. 11B, the suppression coefficient ItHc is set to 0 such that the interpolation coefficients $ch'_0$ and $ch'_7$ become 0. More specifically, the microcomputer 101 supplies, for example, th_c and grad_c given by $$th\_c = ZtH_{max} - 3$$

$$grad\_c = -1$$

to the frequency characteristic control circuit 114.

At this time, since ItHc becomes 0 based on (correction limit amount−2), processing equivalent to that using a smaller number of reference pixels in the interpolation operation can be implemented. More specifically, when the predetermined value of the number of horizontal reference pixels is eight, the interpolation coefficients are 0 for the two pixels at two ends, and the interpolation operation is actually performed for the six horizontal pixels. This enables interpolation processing equivalent to that using a narrower window function in the interpolation function. Since the correction amount ZtH is not limited although the reproduction accuracy of the obtained pixel value is lower, image quality degradation caused by the aberrations can be corrected.

Similarly, image quality degradation caused by the aberrations can be corrected in FIGS. 11C and 11D by changing the suppression coefficient calculation parameters so that the interpolation coefficients to multiply the pixels off the region of the image stored in the storage unit become 0.

Note that the digital camera 100 of the above-described embodiment includes a three plane type image capturing means. However, implementation of the present invention is not limited to this. The digital camera may include, for example, a single plane type image capturing means having color filters in a Bayer array or the like on one image sensor. In this case, the same effect can be obtained by, for example, separating an image signal for each color filter and then applying the correction processing.

As described above, the image processing apparatus of this embodiment can correct degradation in the image quality of a captured image caused by aberrations in consideration of the correction limit. More specifically, the image processing apparatus reads out each region of an image captured using the optical system, and calculates the correction amounts of aberrations caused by the optical system for each pixel of the region. The pixel values of a predetermined number of peripheral pixels around a position apart from the pixel of interest by the distance defined by the calculated aberration correction amounts are multiplied by interpolation coefficients obtained from an interpolation function and added, thereby deriving the pixel value at the pixel position after correction. If the predetermined number of peripheral pixels around the position apart by the distance defined by the calculated aberration correction amounts are not present in the readout region, correction of image quality degradation is implemented by changing the interpolation function. More specifically, the interpolation function is changed such that the frequency response behavior of the interpolation function near the Nyquist frequency becomes more moderate than that of the interpolation function that gives the interpolation coefficients to multiply the predetermined number of peripheral pixels, and used for the correction processing.

This makes it possible to correct image quality degradation caused by aberrations even under the correction limit where a predetermined number of pixels cannot be referred to in the correction processing.

Second Embodiment

In this embodiment, aberration correction processing considering the MTF (Modulation Transfer Function) information of the optical system, which represents the perceived resolution of a captured image, will be described in addition to the above-described first embodiment. Note that the functional arrangement of the digital camera of this embodiment is the same as in the first embodiment. The MTF information of an optical system 102 of a digital camera 100 is stored in an optical correction database 112 and read out in a process of correction processing.

Note that in the above-described first embodiment, an aberration correction amount is calculated based on the approximate function of the correction amount and image height derived by the coefficient generation circuit 113. In the second embodiment, however, a description will be made assuming that the correction amount limit value (first upper limit value) is predetermined by the capacity of a buffer memory 1003 in an optical correction circuit 115. For example, in FIG. 12A, if the approximate function of the correction amount and image height derived by a coefficient generation circuit 113 is indicated by a broken line 1201, the approximate function is limited by a correction amount limit value Lm predetermined by the buffer memory 1003. That is, when the correction amount limit value is predetermined, the correction amount relative to the image height is limited by a bold broken line 1202.

MTF information Co representing the perceived resolution will be explained here.

The MTF information Co is a parameter that can be calculated in advance upon designing the optical system 102, and represents the fineness of an optical image formed by the optical system 102. The MTF information normally lowers as the image height increases, as shown in FIG. 13A. Referring to FIG. 13A, the ordinate represents the MTF information Co which is normalized by the value at the optical center (image height is 0). If the MTF information Co is high, the object has high reproducibility, and the object image is formed in detail on the image sensor. This is expressed as "perceived resolution is high".

When the perceived resolution is high, details of the object image are reproduced. For this reason, the shift or distortion of the object image that has moved due to chromatic aberration of magnification or distortion aberration becomes noticeable. That is, since the influence of aberrations is perceptible at a high perceived resolution, it is necessary to keep the aberration correction amount as high as possible to correct the shift or distortion of the object image. On the other hand, the influence of aberrations is hard to recognize at a low perceived resolution, and it is therefore necessary to lower the aberration correction accuracy and conversely keep the reproducibility of pixels after correction as high as possible. For these reasons, the MTF information Co and the correction limit amount hold a relationship as shown in FIG. 13B.

Figure 7:
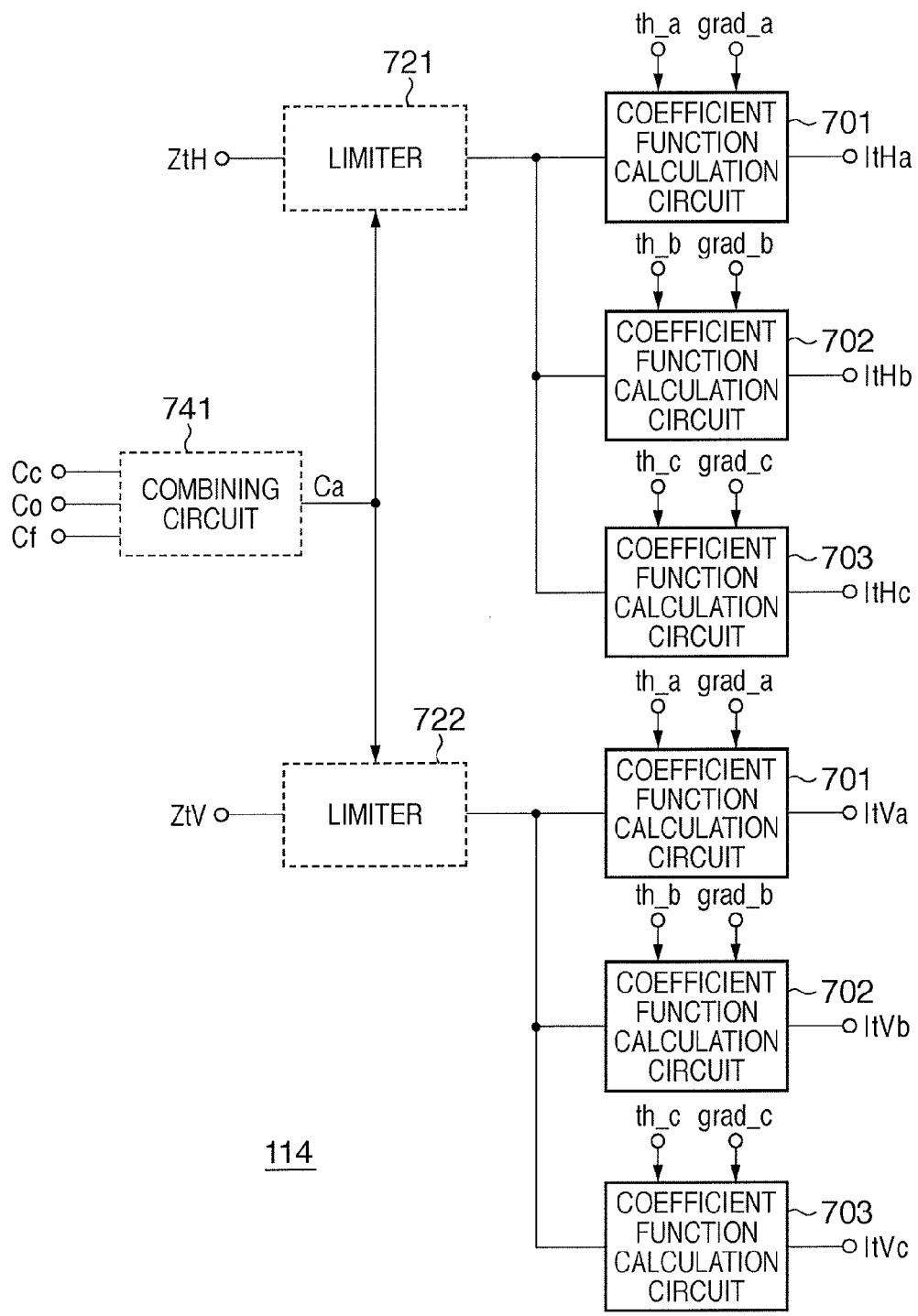
FIG. 7 is a block diagram showing the circuit arrangement of a frequency characteristic control circuit according to the embodiment of the present invention.
Figure 12A:
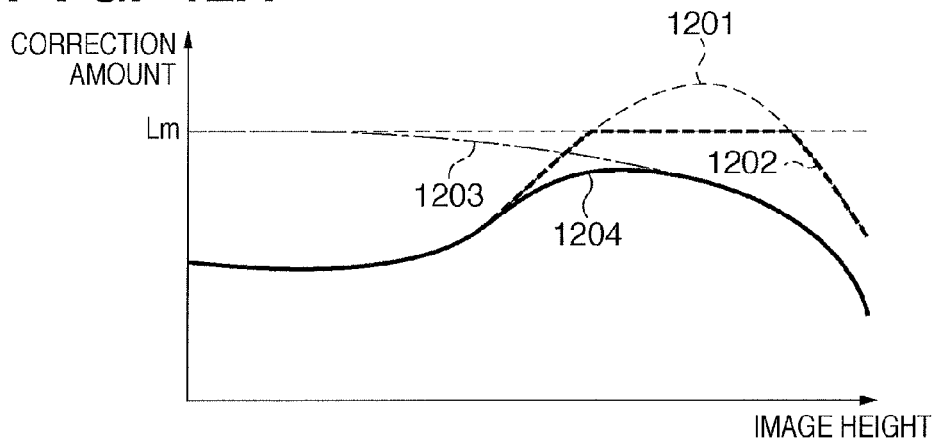
FIGS. 12A, 12B, and 12C are graphs showing the relationship between the image height and the correction amount according to an embodiment of the present invention.

That is, as is apparent from FIGS. 13A and 13B, the correction limit amount considering the MTF information is indicated by an alternate long and short dashed line 1203 (third upper limit value) in FIG. 12A, and the approximate function of the correction amount and image height of this embodiment is indicated by a bold line 1204. The approximate function 1201 of the correction amount and image height derived by the coefficient generation circuit 113 is limited like the approximate function 1204 by the MTF information Co and the capacity of the buffer memory 1003 of the optical correction circuit 115. In this embodiment, such correction amount limitation is implemented by providing limiters 721 and 722 for the horizontal and vertical components in a frequency characteristic control circuit 114, as shown in FIG. 7.

As described above, the image processing apparatus of this embodiment can correct image quality degradation caused by aberrations in consideration of MTF information representing the perceived resolution.

Third Embodiment

This embodiment considers correction characteristic information Cc qualitatively representing what sort of impression will be given by corrected image quality when the approximate function of the correction amount and image height is limited by the correction amount limit value determined by the capacity of a buffer memory 1003, as in the second embodiment, in addition to the arrangement of the first embodiment. The correction characteristic information Cc is determined by degrees Ccw and Cch of impression received from corrected image quality based on information Lw of the range of image heights more than the correction amount limit value and a minimum image height Lh in the image height range when the approximate function of the correction amount and image height is limited.

As for the functional arrangement of a digital camera 100 of this embodiment, a correction characteristic information generation circuit 120 configured to calculate the correction characteristic information Cc is added to the arrangement of the above-described first embodiment. The correction characteristic information generation circuit 120 receives, from a microcomputer 101, plot data Cm1 to Cm4 of the optical correction characteristic information of the optical parameters at the time of image capturing and information of a correction amount limit value Lm predetermined from the capacity of a buffer memory 1003 in an optical correction circuit 115. The correction characteristic information generation circuit 120 calculates the correction characteristic information Cc using the input information.

Figure 14:
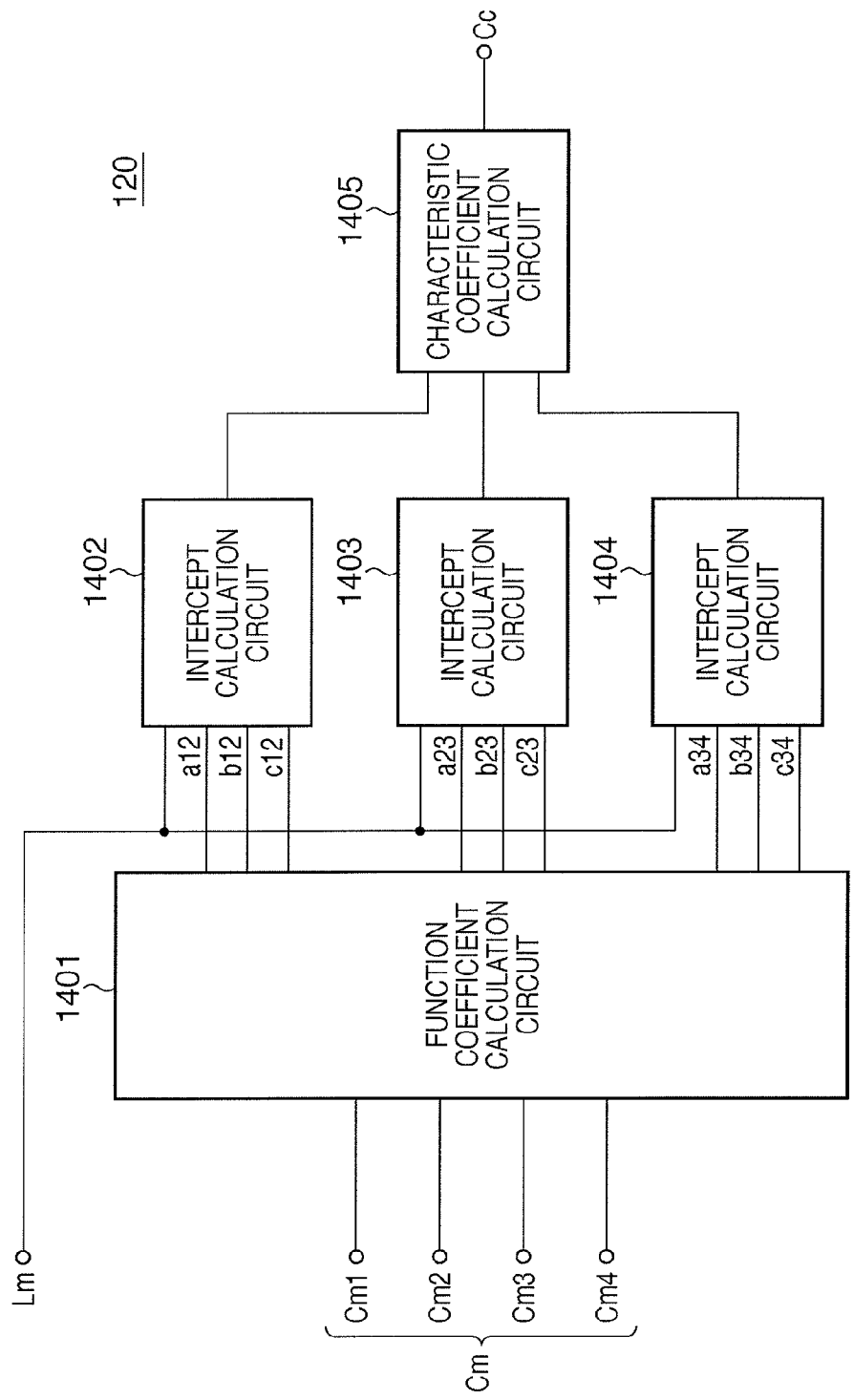
FIG. 14 is a block diagram showing the circuit arrangement of a correction characteristic information generation circuit according to a third embodiment.

The circuit arrangement of the correction characteristic information generation circuit 120 will be described in more detail with reference to FIG. 14. The plot data of the optical correction characteristic information of the optical parameters at the time of image capturing input to the correction characteristic information generation circuit 120 are input to a function coefficient calculation circuit 1401 that is the same as a function coefficient calculation circuit 401 provided in a coefficient generation circuit 113 so as to output the coefficients of the quadratic approximate function between the plots. The coefficients of the approximate function between the plots are output to intercept calculation circuits 1402, 1403, and 1404. Each intercept calculation circuit solves an image height Rt that satisfies $$Lm = a \cdot Rt^2 + b \cdot Rt + c$$

For the image height Rt of each resultant solution, a characteristic coefficient calculation circuit 1405 derives the information Lw of the range of image heights more than the correction amount limit value and the minimum value Lh of the image height in the image height range.

The characteristic coefficient calculation circuit 1405 also calculates the correction characteristic information Cc representing the degree of impression received from corrected image quality based on the obtained information Lw of the range of image heights more than the correction amount limit value and the minimum image height Lh in the image height range. The minimum image height Lh in the range of image heights more than the correction amount limit value and the degree Cch of impression received from corrected image quality are represented by the relationship shown in FIG. 13C. The range Lw of image heights more than the correction amount limit value and the degree Ccw of impression received from corrected image quality are represented by the relationship shown in FIG. 13D.

The degrees Ccw and Cch of impression are normalized by externally set normalization levels Cchn and Ccwn. The normalization levels Cchn and Ccwn are image quality adjustment items that are set not to make the degree of impression received from the corrected image quality lead to image quality degradation, and their values are experimentally obtained.

The concept of the degree of impression received from corrected image quality in this embodiment will be described here. In this embodiment, assume that information existing at the optical center (image height is 0) is regarded as the important object image by setting an image capturing mode such as a portrait mode. That is, the observer determines the image quality of the object image located at the center of the frame as the quality of the image. More specifically, in the range more than the correction amount limit value, the accuracy of correcting the shift or distortion of the object image caused by aberrations is supposed to be lower, and the image quality degrades. For this reason, as the minimum image height Lh in the image height range becomes closer to the optical center, the shift or distortion caused by aberrations in the object image located at the center of the frame remains uncorrected and easily makes the observer perceive degradation in image quality. When the range Lw of image heights more than the correction amount limit value is wide, the image height range in which the shift or distortion caused by aberrations remains uncorrected in the image after correction becomes wider. For this reason, the observer readily notices image quality degradation caused by the poor correction accuracy.

As described above, in this embodiment, the characteristic coefficient calculation circuit 1405 selects, for example, a larger one of the qualitatively determined degrees Ccw and Cch of impression received from corrected image quality, and outputs it to a frequency characteristic control circuit 114 as the correction characteristic information Cc. That is, the higher the correction characteristic information Cc obtained by the correction characteristic information generation circuit 120 is, the more the observer readily perceives image quality degradation. It is therefore necessary to keep the aberration correction amount as high as possible to correct the shift or distortion of the object image. On the other hand, the lower the correction characteristic information Cc is, the more the observer hardly perceives image quality degradation. It is conversely necessary to lower the aberration correction accuracy and keep the reproducibility of pixels after correction as high as possible. Hence, the correction characteristic information Cc and the correction limit amount hold a relationship as shown in FIG. 13E.

Figure 12B:
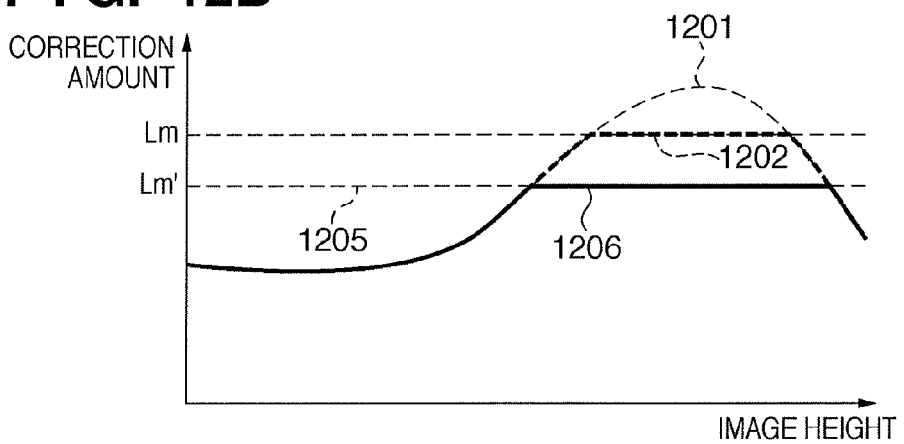

When the correction amount limit value is determined by the capacity of the buffer memory 1003 provided in the optical correction circuit 115, and the approximate function of the correction amount and image height is obtained from the optical parameters at the time of image capturing, the range Lw of image heights more than the correction amount limit value and the minimum image height Lh in the image height range are calculated. The correction characteristic information Cc is obtained from the obtained image height range Lw and minimum image height Lh, and information of a correction amount limit value Lm' (second upper limit value) corresponding to the obtained correction characteristic information Cc is obtained from the graph of FIG. 13E. That is, the approximate function of the correction amount and image height of this embodiment is represented by a bold line 1206 that is limited by a broken line 1205 representing the correction limit amount Lm' smaller than the upper limit value (smaller than the first upper limit value) of the correction amount in FIG. 12B. An approximate function 1201 of the correction amount and image height derived by the coefficient generation circuit 113 is limited like the approximate function 1206 by the correction characteristic information Cc and the capacity of the buffer memory 1003 in the optical correction circuit 115. In this embodiment, such correction amount limitation is implemented by providing limiters 721 and 722 for the horizontal and vertical components in the frequency characteristic control circuit 114, as shown in FIG. 7.

As described above, the image processing apparatus of this embodiment sets the limit value after correction while giving priority to keeping the reproducibility of pixels after correction high over keeping the correction accuracy as the observer's sensitivity to image quality degradation after correction is regarded lower. That is, the image processing apparatus can correct image quality degradation caused by aberrations in consideration of correction characteristic information which is determined by the correction amount limit value and represents the degree of impression received from corrected image quality.

Fourth Embodiment

In this embodiment, aberration correction processing considering object feature information that is obtained by detecting the edge components or motion vector in a captured image and represents the degree of feature of an object image will be described in addition to the arrangement of the first embodiment. Note that in this embodiment as well, a case will be described in which the approximate function of the correction amount and image height is limited by the correction amount limit value determined by the capacity of a buffer memory 1003, as in the second embodiment. Note that object feature information Cf is a value representing whether a captured image has a feature, that is, whether the pixel value reproducibility is required at the time of correction.

As for the functional arrangement of a digital camera 100 of this embodiment, a feature detection circuit 130 configured to calculate a feature evaluation value Id necessary for deriving the object feature information Cf is added to the arrangement of the above-described first embodiment. The feature detection circuit 130 changes its circuit arrangement in accordance with the type of information to be detected as a feature of an object image such as a gradient, high-frequency component, or motion. The circuit arrangement for each information to be detected will be described below with reference to FIGS. 15A to 15C.

Figure 15A:
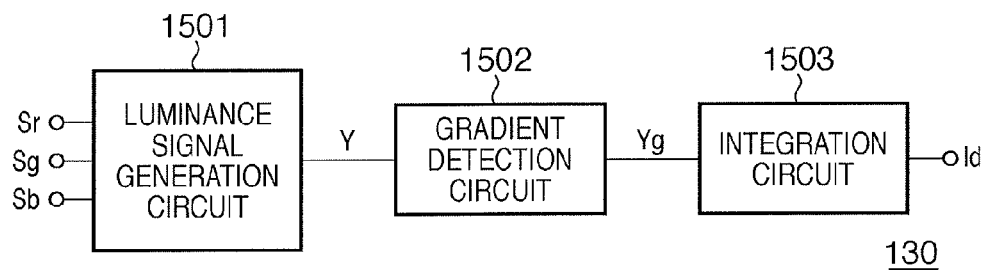
FIGS. 15A, 15B, and 15C are block diagrams showing the circuit arrangements of a feature detection circuit according to a fourth embodiment of the present invention.

When detecting a gradient (edge) as an edge component between pixels as a feature of an object image, the feature detection circuit 130 generally has a circuit arrangement as shown in FIG. 15A. Upon receiving digital images Sr, Sg, and Sb of RGB from an AFE 109, a luminance signal generation circuit 1501 calculates a luminance value y of a pixel of interest from the pixel value of the pixel of interest in each digital image by $$y = 0.299Sr + 0.587Sg + 0.114Sb$$

The luminance value y thus calculated for all pixels is output to a gradient detection circuit 1502 as a luminance signal (luminance image). The gradient detection circuit 1502 is, for example, a Sobel filter. Upon receiving a luminance signal Y from the luminance signal generation circuit 1501, the gradient detection circuit 1502 outputs a gradient amount Yg (the primary differential value of the luminance signal) at the position of the pixel of interest. The gradient amount Yg obtained by the gradient detection circuit 1502 is input to an integration circuit 1503 which outputs the integrated value of the gradient amount Yg as the feature evaluation value Id for each rectangular region obtained by segmenting the luminance signal of the captured image.

Figure 15B:
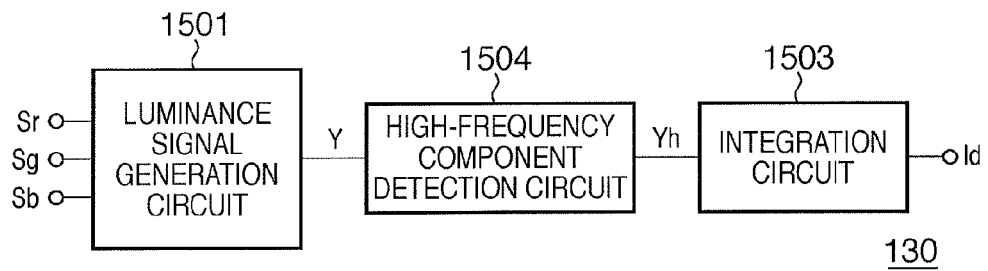

When detecting the high-frequency component of the luminance signal Y as a feature of an object image, the feature detection circuit 130 generally has a circuit arrangement as shown in FIG. 15B. Upon receiving the digital images Sr, Sg, and Sb of RGB from the AFE 109, the luminance signal generation circuit 1501 converts the digital images into the luminance signal Y and outputs it to a high-frequency component detection circuit 1504. The high-frequency component detection circuit 1504 is, for example, a band-pass filter which outputs a high-frequency component Yh (the secondary differential value of the luminance signal) at the position of the pixel of interest. The high-frequency component Yh obtained by the high-frequency component detection circuit 1504 is input to the integration circuit 1503 which outputs the integrated value of the high-frequency component Yh as the feature evaluation value Id for each rectangular region obtained by segmenting the luminance signal of the captured image.

If the feature evaluation value Id obtained by gradient detection or high-frequency component detection is large, the region includes the feature of the captured image, and the pixel value reproducibility is required at the time of correction. Hence, the object feature information Cf as shown in FIG. 13F is obtained.

Figure 15C:
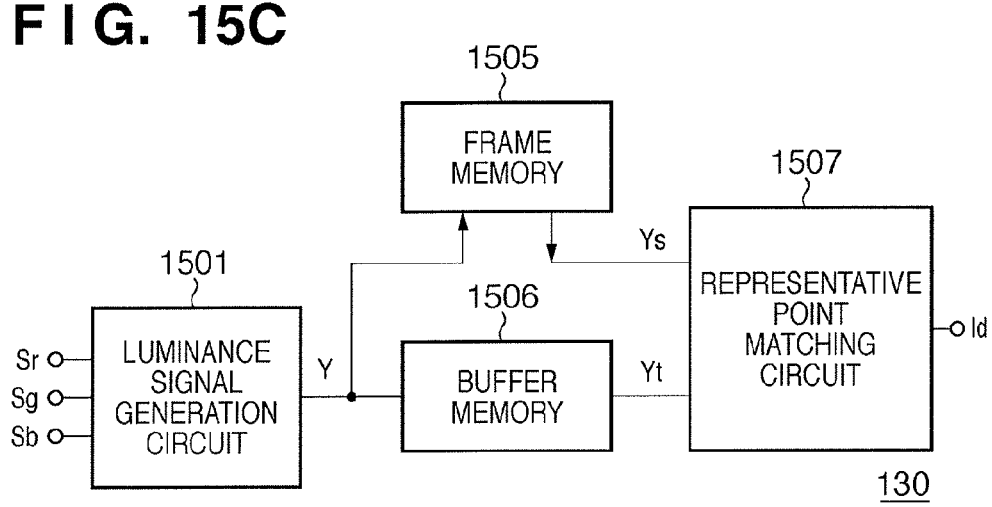

When detecting a motion vector in continuous images as a feature of an object image, the feature detection circuit 130 has a circuit arrangement as shown in FIG. 15C. Note that the arrangement shown in FIG. 15C is the general arrangement of a motion vector analyzing circuit using a matching operation based on representative points. Upon receiving the digital images Sr, Sg, and Sb of RGB from the AFE 109, the luminance signal generation circuit 1501 converts the digital images into the luminance signal Y and outputs it to a frame memory 1505. The frame memory 1505 has a capacity for holding at least two luminance representative point frames, and holds a representative point data image by resampling the luminance signal Y horizontally and vertically at a predetermined pixel interval. The representative point data image created by the frame memory 1505 is held in a buffer memory 1506 as well.

A representative point matching circuit 1507 compares the representative point data image stored in the frame memory 1505 with that stored in the buffer memory 1506, thereby calculating and outputting the feature evaluation value Id for each rectangular region obtained by segmenting the luminance signal of the captured image. More specifically, the representative point data image stored in the buffer memory 1506 is segmented into rectangular regions and sequentially output to the representative point matching circuit 1507. The representative point matching circuit 1507 reads out a representative point pixel group Ys having the same size as the rectangular region sequentially from the upper left of the frame memory 1505, and searches for the position of the representative point pixel group Ys whose difference from a representative point pixel group Yt input from the buffer memory 1506 is minimum. The representative point matching circuit 1507 calculates the motion vector of the rectangular region from the readout position of the representative point pixel group Ys with the minimum difference and the position of the rectangular region input from the buffer memory 1506. The representative point matching circuit 1507 also outputs the reciprocal of the scalar quantity of the motion vector in each region as the feature evaluation value Id.

If the feature evaluation value Id obtained by motion vector detection is small, the region includes the motion of the object on the captured image. For this reason, the shift or distortion of the object image caused by aberrations is unnoticeable. That is, in motion vector detection, the aberration correction accuracy is not required as the motion vector becomes large. Since the correction amount can be decreased to raise the pixel value reproducibility, the object feature information Cf as shown in FIG. 13G is obtained.

As described above, in this embodiment, the feature detection circuit 130 calculates the feature evaluation value Id and obtains the object feature information Cf that is the pixel value reproducibility required at the time of correction. When the object feature information Cf is small, the requirement of pixel value reproducibility is high. It is therefore necessary to increase the number of reference pixels in correction processing and raise the pixel value reproducibility by limiting the aberration correction amount. That is, the object feature information Cf and the correction limit amount hold a relationship as shown in FIG. 13H.

More specifically, when the feature detection circuit 130 calculates the feature evaluation value Id, a microcomputer 101 obtains the object feature information Cf determined by the type of feature detection. The microcomputer 101 also obtains the information of a correction limit amount Lm' (fourth and fifth upper limit values) corresponding to the obtained object feature information Cf from the graph of FIG. 13H. That is, the approximate function of the correction amount and image height of this embodiment is represented by a bold line 1206 that is limited by the correction limit amount Lm' in FIG. 12B, as in the third embodiment. An approximate function 1201 of the correction amount and image height derived by a coefficient generation circuit 113 is limited like the approximate function 1206 by the object feature information Cf and the capacity of the buffer memory 1003 in an optical correction circuit 115. In this embodiment, such correction amount limitation is implemented by providing limiters 721 and 722 for the horizontal and vertical components in a frequency characteristic control circuit 114, as shown in FIG. 7.

As described above, the image processing apparatus of this embodiment sets the correction amount limit value while giving priority to keeping the reproducibility of pixels after correction high over keeping the correction accuracy as the requirement of the pixel value reproducibility at the time of correction is regarded higher. That is, the image processing apparatus can correct image quality degradation caused by aberrations in consideration of object feature information that is the requirement of pixel value reproducibility determined by the edge component, high-frequency component, motion vector or the like of a captured image.

Fifth Embodiment

In this embodiment, limitation of an approximate function of the correction amount and image height and an aberration correction method considering all of MTF information Co, correction characteristic information Cc, and object feature information Cf described above in the second to fourth embodiments will be described. As for the functional arrangement of a digital camera 100 of this embodiment, a correction characteristic information generation circuit 120 and a feature detection circuit 130 are added to the arrangement of the first embodiment. In addition, the MTF information is managed in an optical correction database 112.

Information of the above-described embodiments will be summarized.

The MTF information Co representing the perceived resolution becomes higher as the image height lowers.

The correction accuracy is required as the MTF information Co becomes higher.

The reproducibility is required more than the correction accuracy as the MTF information Co becomes lower.

The correction characteristic information Cc representing the degree of impression of corrected image quality becomes higher as the range of image heights more than the correction amount limit value widens.

becomes lower as the minimum image height more than the correction amount limit value decreases.

The correction accuracy is required as the correction characteristic information Cc becomes higher.

The reproducibility is required more than the correction accuracy as the correction characteristic information Cc becomes lower.

The object feature information Cf representing the degree of feature of an object image becomes higher in a region where the edge component is large.

becomes higher in a region where the high-frequency component is large.

becomes higher in a region where the motion vector is small.

The correction accuracy is required as the object feature information Cf becomes higher.

The reproducibility is required more than the correction accuracy as the object feature information Cf becomes lower.

Figure 12C:
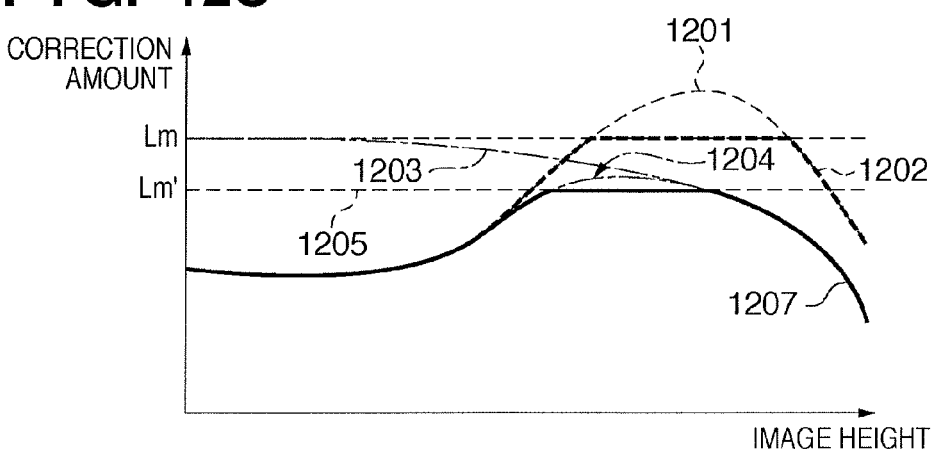

Hence, as each information gets closer to 1, the aberration correction accuracy tends to be kept extremely high, as is apparent from FIGS. 13B, 13E, and 13H. More specifically, when the MTF information Co, correction characteristic information Cc, and object feature information Cf are integrated, and the minimum value of the correction limit amount derived by, for example, the image height is selected, the limited approximate function of the correction amount and image height is represented by a bold line 1207 in FIG. 12C.

As described above, the image processing apparatus of this embodiment can correct image quality degradation caused by aberrations in consideration of the feature of the captured image and the correction amount limit value.

Note that in the above embodiments, a digital camera having an optical system has been described as an example of the image processing apparatus. However, implementation of the present invention is not limited to this. For example, the image processing apparatus may be a device such as a printer that receives image input. In this case, the information of the aberrations of the optical system is input as one file together with the image or contained in the data information of the image. The image processing apparatus reads out the information of aberrations of the optical system in a process of correction processing and executes the above-described correction processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-076201, filed Mar. 29, 2010, which is hereby incorporated by reference herein in its entirety.

What is claimed is:

1. An image processing apparatus comprising:
a memory configured to read out and store a partial region image of an image;
a calculation unit configured to calculate, for correcting a signal value of an interest pixel of the partial region image, a reference position in the partial region image based on the position of the interest pixel, where the reference position is different from the position of the interest pixel; and
a correction unit connected to said memory and configured to calculate the signal value of the interest pixel using signal values of a predetermined number of peripheral pixels centered on the reference position and interpolation coefficients which are multiplied with the signal values of the predetermined number of peripheral pixels;
wherein, said correction unit uses a different interpolation coefficients for a case where the predetermined number of peripheral pixels cannot be obtained because the reference position is near the edge of the partial region image and for a case where the predetermined number of peripheral pixels can be obtained.

2. The image processing apparatus according to claim 1, wherein in the case where the predetermined number of peripheral pixels cannot be obtained because the reference position is near the edge of the partial region image, said correction unit calculates the signal value of the interest pixel using peripheral pixels, the number of which is less than the predetermined number, and the interpolation coefficients.

3. The image processing apparatus according to claim 1, wherein said correction unit comprises:
a first interpolation unit configured to calculate using interpolation coefficients for horizontal components; and
a second interpolation unit configured to calculate using interpolation coefficients for vertical components.

4. The image processing apparatus according to claim 3, wherein said correction unit inputs the signal values of the peripheral pixels to said first interpolation unite and inputs signal values which are output from said first interpolation units to said second interpolation unit.

5. The image processing apparatus according to claim 1, wherein
the interpolation coefficients are obtained from interpolation functions, and
said correction unit uses the different interpolation coefficients for a case where the reference position calculated by said calculation unit is a position where the predetermined number of peripheral pixels cannot be obtained from near the edge of the partial region image.

6. The image processing apparatus according to claim 5, wherein the frequency response behavior near the Nyquist frequency of an interpolation function, which is used for a case where the predetermined number of peripheral pixels can be obtained, is steeper than that of an interpolation function, which is used for a case where the predetermined number of peripheral pixels cannot be obtained.

7. A method of controlling an image processing apparatus comprising:
- a storing step for reading out and storing a partial region image of an image to a memory;
- a calculation step for calculating, for correcting a signal value of an interest pixel of the partial region image, a reference position in the partial region image based on the position of the interest pixel, where the reference position is different from the position of the interest pixel;
- a correction step for calculating the signal value of the interest pixel using signal values of a predetermined number of peripheral pixels centered on the reference position and interpolation coefficients which are multiplied with the signal values of the predetermined number of peripheral pixels;
- wherein, in the correction step, different interpolation coefficients are used for a case where the predetermined number of peripheral pixels cannot be obtained because the reference position is near the edge of the partial region image and for a case where the predetermined number of peripheral pixels can be to obtained.

8. A non-transitory computer-readable recording medium storing a program for causing a computer to execute each step of the method of controlling the image processing apparatus according to claim 7.

* * * * *